US011859524B2

(12) United States Patent
Ahn

(10) Patent No.: US 11,859,524 B2
(45) Date of Patent: Jan. 2, 2024

(54) METHOD FOR INTERLOCKING ENGINE EXHAUST SOUND WITH TRAVELING MODE AND EXHAUST SYSTEM FOR SMART VEHICLE

(71) Applicants: Hyundai Motor Company, Seoul (KR); Kia Motors Corporation, Seoul (KR)

(72) Inventor: Hyeon-Gyun Ahn, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 368 days.

(21) Appl. No.: 17/142,417

(22) Filed: Jan. 6, 2021

(65) Prior Publication Data

US 2022/0056827 A1 Feb. 24, 2022

(30) Foreign Application Priority Data

Aug. 18, 2020 (KR) ........................ 10-2020-0103291

(51) Int. Cl.
*F01N 1/16* (2006.01)
*F02D 9/04* (2006.01)
(Continued)

(52) U.S. Cl.
CPC ............... *F01N 1/168* (2013.01); *F01N 1/02* (2013.01); *F01N 13/082* (2013.01); *F02D 9/04* (2013.01);
(Continued)

(58) Field of Classification Search
CPC . F01N 1/168; F01N 1/16; F01N 1/166; F01N 1/163; F01N 1/02; F01N 1/084;
(Continued)

(56) References Cited

U.S. PATENT DOCUMENTS 4,866,933 A * 9/1989 Kao ........................ F01N 1/166
181/254
5,097,664 A * 3/1992 Nagatomo .............. F02B 27/06
181/254
(Continued)

FOREIGN PATENT DOCUMENTS

CN 112228193 A * 1/2021
DE 102016118740 A1 * 4/2017
(Continued)

*Primary Examiner* — Edgardo San Martin
(74) *Attorney, Agent, or Firm* — MORGAN, LEWIS & BOCKIUS LLP

(57) ABSTRACT

A method for automatically changing the engine exhaust sound in conjunction with the traveling mode implemented by the exhaust system applied to the vehicle may vary the valve opening of an electronic variable valve provided in a first tail pipe of first and second tail pipes of muffler discharging the exhaust gas coming from an engine by a mode recognition logic connected to an engine ECU to the atmosphere, and control the variation of the valve opening with the engine torque and the engine RPM based on a change in an accelerator pedal stroke in any one of a SMART DRIVE MODE-ECO state, a SMART DRIVE MODE-COMFORT state, and a SMART DRIVE MODE-SPORT state, implementing a quiet engine exhaust sound and a sporty engine exhaust sound depending on various vehicle traveling states provided by the SMART DRIVE MODE and increasing vehicle/engine outputs.

15 Claims, 16 Drawing Sheets

(51) Int. Cl.
*G10K 11/16* (2006.01)
*G10K 15/04* (2006.01)
*F01N 13/08* (2010.01)
*F01N 1/02* (2006.01)

(52) U.S. Cl.
CPC ............ *G10K 11/161* (2013.01); *G10K 15/04* (2013.01); *F02D 2200/602* (2013.01); *F02D 2200/606* (2013.01)

(58) Field of Classification Search
CPC .......... F01N 1/089; F01N 13/082; F02D 9/04; F02D 9/08; F02D 2200/602; F02D 2200/606; G10K 11/161; G10K 15/04
See application file for complete search history.

(56) References Cited

U.S. PATENT DOCUMENTS

| | | | | |
|---|---|---|---|---|
| 6,732,510 B2 * | 5/2004 | Ciray | F01N 1/08 | 181/254 |
| 7,337,609 B2 * | 3/2008 | Mahnken | F01N 3/023 | 181/254 |
| 7,438,157 B2 * | 10/2008 | Schorn | F01N 1/006 | 181/254 |
| 7,506,723 B2 * | 3/2009 | Hoerr | F01N 1/166 | 181/254 |
| 7,712,578 B2 * | 5/2010 | Han | F01N 1/084 | 181/275 |
| 10,082,058 B2 * | 9/2018 | Creager | F01N 1/165 | |
| 10,443,479 B2 * | 10/2019 | Dmytrow | F01N 13/087 | |
| 10,895,181 B2 * | 1/2021 | Ahn | F01N 1/24 | |
| 11,401,848 B2 * | 8/2022 | Drees | F02D 9/04 | |
| 2003/0121720 A1 * | 7/2003 | Chang | F01N 3/0335 | 181/254 |
| 2018/0223709 A1 * | 8/2018 | Pietila | F01N 1/168 | |

FOREIGN PATENT DOCUMENTS

| | | | | |
|---|---|---|---|---|
| DE | 102016220172 | A1 | * | 4/2018 |
| JP | 2519596 | B2 | * | 7/1996 |
| JP | 2009215942 | A | * | 9/2009 |
| KR | 100950997 | B1 | * | 4/2010 |
| KR | 10-2015-0070560 | A | | 6/2015 |
| KR | 20190023710 | A | * | 3/2019 |

* cited by examiner

A~A' SECTION

METHOD FOR INTERLOCKING ENGINE EXHAUST SOUND WITH TRAVELING MODE AND EXHAUST SYSTEM FOR SMART VEHICLE

CROSS-REFERENCE TO RELATED APPLICATION

The present application claims priority to Korean Patent Application No. 10-2020-0103291, filed on Aug. 18, 2020, the entire contents of which is incorporated herein for all purposes by this reference.

BACKGROUND OF THE PRESENT INVENTION

Field of the Invention

The present invention relates to an engine exhaust sound control, and particularly, to an exhaust system for a smart vehicle, which automatically changes an engine exhaust sound without driver's mode operation, in the case of a smart drive mode in which a vehicle traveling mode of a vehicle is automatically switched according to a traveling state.

Description of Related Art

Generally, a muffler for a vehicle exhaust system is a portion of the exhaust system, and contributes to increasing an engine output and reduces an exhaust gas combustion sound due to an engine explosion.

Furthermore, the muffler also contributes to implementing an engine exhaust sound characteristically.

As an example, to change the engine exhaust sound, a method for additionally applying a pressure-type variable valve to an internal structure of the muffler among the portions of the exhaust system, or changing the internal structure while deleting the pressure-type variable valve is used.

As another example, after the internal structure of the muffler is changed, a technology of applying an electronic variable valve to a rear side tail pipe and controlling and adjusting an opening of the electronic variable valve according to an operation of the traveling mode is applied, and the driver directly operates the engine exhaust sound in the switch ON/OFF method of the electronic variable valve, implementing a distinctive exhaust sound.

In recent years, the vehicles implementing such a vehicle traveling mode and the physical exhaust sound may further improve driving pleasure.

However, the method for changing the internal structure of the muffler, the method for changing the engine exhaust sound according to the operation of the traveling mode, and the switch ON/OFF method of the electronic variable valve have the following limits.

As an example, there is a limit in that the method for changing the internal structure of the muffler implements only one exhaust sound, and there is a hassle in that in the method for operating the traveling mode or the switch ON/OFF method of the electronic variable valve, when the physical exhaust sound is directed to be changed, the driver is required to manually and directly operate a vehicle traveling mode selection device or a switch. That is, there is inconvenience in that the direct and manual operation of the driver is required in the place in which a quiet exhaust sound is needed, and the direct and manual operation of the driver is required even in a suburban, or a place capable of feeling a sporty exhaust sound, such as a track.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for interlocking an engine exhaust sound with a vehicle traveling mode and an exhaust system for a smart vehicle, which implement the traveling of a vehicle as a SMART DRIVE MODE-ECO state, a SMART DRIVE MODE-COMFORT state, and a SMART DRIVE MODE-SPORT state which are automatically switched depending on a traveling state according to a driving pattern and a driving habit when a driver selects a smart drive mode upon traveling of a vehicle, automatically changing an exhaust sound even without the driver's mode operation, and interlock a change in an accelerator pedal stroke with each of the SMART DRIVE MODE-ECO state, the SMART DRIVE MODE-COMFORT state, and the SMART DRIVE MODE-SPORT state so that the quiet exhaust sound and the sporty exhaust sound not only contribute to an increase in the vehicle/engine outputs but also are automatically changed depending on the individual driving style and habit of the driver.

A method for interlocking an engine exhaust sound with a vehicle traveling mode according to various exemplary embodiments of the present invention for achieving the object includes: confirming the vehicle traveling mode in a SMART DRIVE MODE generated by a mode selection device of a traveling mode system; and performing a SMART SHIFT control in which the engine exhaust sound is automatically switched, the engine exhaust sound being generated by a muffler discharging an exhaust gas to an atmosphere according to a valve opening of an electronic variable valve, which is changed based on an accelerator pedal stroke, in the SMART DRIVE MODE.

As various exemplary embodiments of the present invention, the SMART DRIVE MODE includes: a SMART DRIVE MODE-SPORT state, a SMART DRIVE MODE-ECO state, and a SMART DRIVE MODE-COMFORT state, and includes: a sporty exhaust sound-based map and a quiet exhaust sound-based map corresponding to each state.

As various exemplary embodiments of the present invention, the performing of the SMART SHIFT control includes: controlling to automatically switch the SMART DRIVE MODE, which enters any one of the SMART DRIVE MODE-ECO state, the SMART DRIVE MODE-COMFORT state, and the SMART DRIVE MODE-SPORT state by confirming the accelerator pedal stroke; and controlling to match a switching mode exhaust sound, which generates an engine exhaust sound to which the sporty exhaust sound-based map is applied or an engine exhaust sound to which the quiet exhaust sound-based map is applied.

As various exemplary embodiments of the present invention, the accelerator pedal stroke is classified into a first threshold of the accelerator pedal stroke, which is an entry reference of the SMART DRIVE MODE-SPORT state, and a second threshold of the accelerator pedal stroke, which is an entry reference of the SMART DRIVE MODE-ECO state and the SMART DRIVE MODE-COMFORT state.

As various exemplary embodiments of the present invention, the first threshold value of the accelerator pedal stroke is a value greater than the second threshold value of the accelerator pedal stroke.

As various exemplary embodiments of the present invention, the SMART DRIVE MODE enters the SMART DRIVE MODE-SPORT state in an accelerator pedal stroke exceeding the first threshold of the accelerator pedal stroke, enters the SMART DRIVE MODE-ECO state in an accelerator pedal stroke smaller than the second threshold of the accelerator pedal stroke, and enters the SMART DRIVE MODE-COMFORT state in an accelerator pedal stroke which is equal to or less than the first threshold of the accelerator pedal stroke and equal to or greater than the second threshold of the accelerator pedal stroke.

As various exemplary embodiments of the present invention, the generation of the exhaust sound to which the sporty exhaust sound-based map is applied is applied to the SMART DRIVE MODE-SPORT state, and the generation of the exhaust sound to which the quiet exhaust sound-based map is applied is applied to the SMART DRIVE MODE-ECO state and the SMART DRIVE MODE-COMFORT state.

As various exemplary embodiments of the present invention, each of the quiet exhaust sound-based map and the sporty exhaust sound-based map is a setting condition in which the valve opening of the electronic variable valve is set in combination of closing, 50% opening, and 100% opening conditions.

As various exemplary embodiments of the present invention, the electronic variable valve generates the valve opening in the quiet exhaust sound-based map and the sporty exhaust sound-based map according to the change in the accelerator pedal stroke.

As various exemplary embodiments of the present invention, the electronic variable valve is provided on any one of a first tail pipe and a second tail pipe through which the exhaust gas is discharged from the muffler to the atmosphere.

Furthermore, an exhaust system for a smart vehicle according to various exemplary embodiments of the present invention for achieving the object includes: a muffler for discharging an exhaust gas coming from an engine to a first tail pipe and a second tail pipe to an atmosphere; an electronic variable valve provided on the first tail pipe, and forming a valve opening in an internal space of the first tail pipe; and an exhaust sound change system for recognizing any one of a SMART DRIVE MODE-ECO state, a SMART DRIVE MODE-COMFORT state, and a SMART DRIVE MODE-SPORT state as a vehicle traveling state in a SMART SHIFT control in a SMART DRIVE MODE, and changing the valve opening of the electronic variable valve based on the accelerator pedal stroke.

As various exemplary embodiments of the present invention, the valve opening is changed to any one of closing, 50% opening, and 100% opening.

As various exemplary embodiments of the present invention, the muffler includes: a housing forming an internal space, a pair of a first baffle and a second baffle for partitioning the internal space of the housing into a first chamber, a second chamber, and a third chamber, an inlet tube for introducing the exhaust gas to send a portion of the introduced exhaust gas to the first chamber through a punching hole, a 1IN-2OUT Y-shaped tube for sending a portion of branched exhaust gas of remaining introduced exhaust gas coming from the inlet tube to the first tail pipe to form a first exhaust sound tone change section and sending remaining branched exhaust gas to the third chamber to form a third exhaust sound tone change section, and a second external connection tube for introducing an internal exhaust gas coming from the first chamber to send the internal exhaust gas to the second tail pipe to discharge the internal exhaust gas and sending a portion of the internal exhaust gas through the punching hole to the third chamber to form a second exhaust sound tone change section.

As various exemplary embodiments of the present invention, the punching hole perforated in the first baffle and a first open space portion and a second open space portion perforated in the second baffle communicate the third chamber with the second chamber and the first chamber.

As various exemplary embodiments of the present invention, the 1IN-2OUT Y-shaped tube includes a first external connection tube connected to the first tail pipe by forming one outlet of two outlets while being connected to the inlet tube by one inlet and an extension tube connected to the third chamber by forming another outlet.

As various exemplary embodiments of the present invention, the second external connection tube has a double tube, and the double tube does not cover the punching hole.

As various exemplary embodiments of the present invention, in the first exhaust sound tone change section, the exhaust gas sent to the first tail pipe by closing the first tail pipe with the electronic variable valve is sent to the internal space of the housing, in the second exhaust sound tone change section, a portion of the exhaust gas sent to the second tail pipe exits the internal space of the housing, and in the third exhaust sound tone change section, a branched exhaust gas of the exhaust gas sent to the first tail pipe is sent to the internal space of the housing.

As various exemplary embodiments of the present invention, the engine exhaust sound change system has a quiet exhaust sound-based map matching with the SMART DRIVE MODE-ECO state and the SMART DRIVE MODE-COMFORT state and a sporty exhaust sound-based map matching with the SMART DRIVE MODE-SPORT state, and each of the quiet exhaust sound-based map and the sporty exhaust sound-based map matches with a voltage signal controlling the electronic variable valve.

As various exemplary embodiments of the present invention, the voltage signal is output as 9 to 16 V.

As various exemplary embodiments of the present invention, the engine exhaust sound change system is connected to a traveling mode system having a mode selection device configured for selecting a SMART DRIVE MODE via PWM communication, the SMART DRIVE MODE being switched to the SMART DRIVE MODE-ECO state, the SMART DRIVE MODE-COMFORT state, and the SMART DRIVE MODE-SPORT state.

As various exemplary embodiments of the present invention, the mode selection device has a selection function of SMART/ECO/COMFORT/SPORT DRIVE MODES.

As various exemplary embodiments of the present invention, the engine exhaust sound change system is implemented by the accelerator pedal stroke, and the electronic variable valve is connected to an engine ECU via PWM communication.

The control of interlocking the engine exhaust sound with the traveling mode applied to the exhaust system for the smart vehicle according to various exemplary embodiments of the present invention implements the following operations and effects.

First, it is possible to change the engine exhaust sound in conjunction with the SPORT DRIVE MODE o in the SMART DRIVE MODE-ECO state, the SMART DRIVE MODE-COMFORT state, and the SMART DRIVE MODE-SPORT state in which the driving style and habit are reflected upon traveling of a vehicle. Second, it is possible to change the engine exhaust sound depending on the switching between the SMART DRIVE MODE-ECO state, the SMART DRIVE MODE-COMFORT state, and the SMART DRIVE MODE-SPORT state according to the change in the accelerator pedal stroke, automatically changing the engine exhaust sound even without the driver's mode operation. Third, it is possible to combine the internal structure of the muffler and the electronic variable valve with the change in the engine exhaust sound, greatly improving the engine exhaust sound differentiating effects and also increasing the vehicle/engine outputs due to the structure of the low back pressure main muffler.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
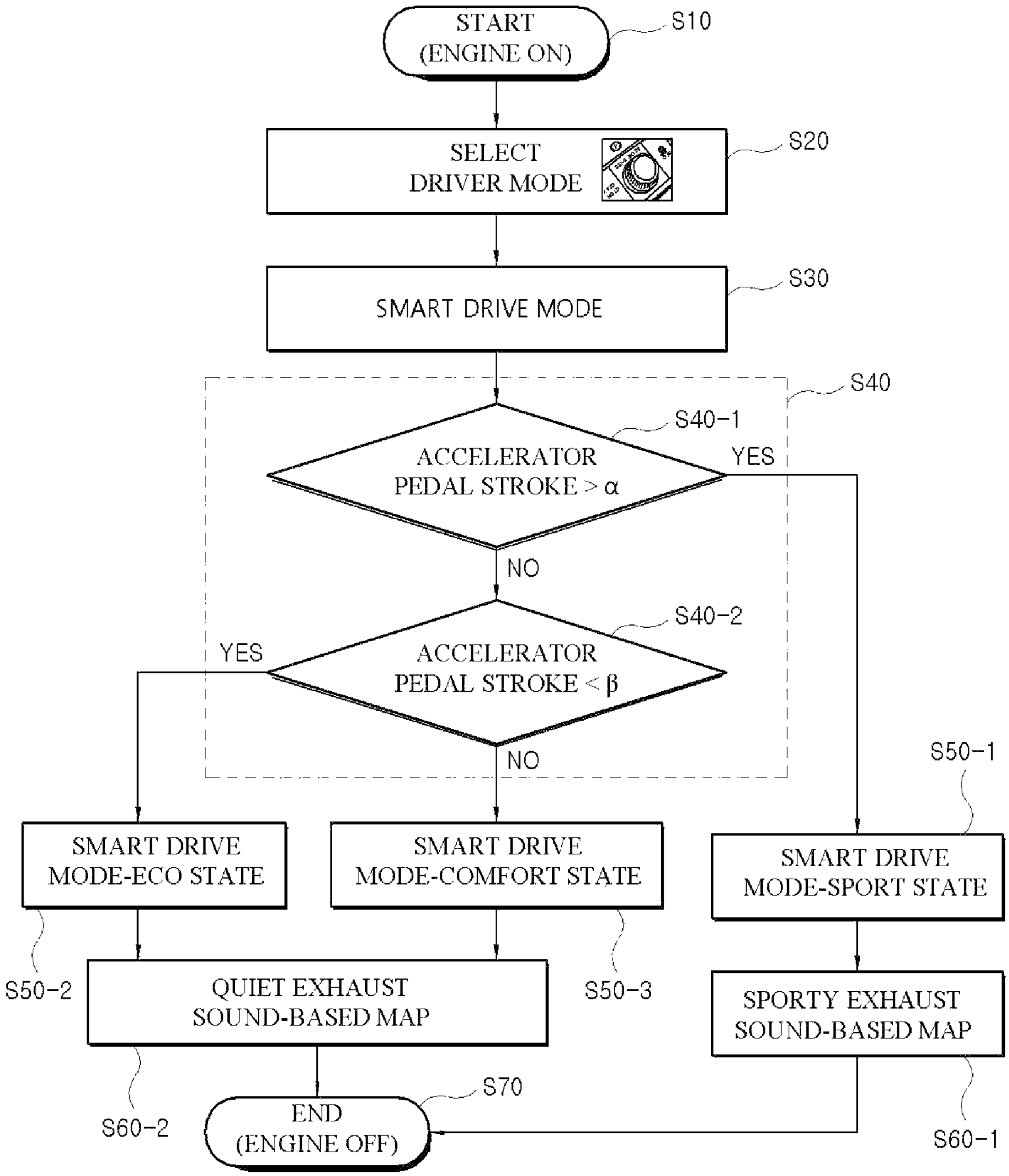
FIG. 1 is a flowchart illustrating a method for interlocking an engine exhaust sound implemented by an exhaust system for a vehicle with a vehicle traveling mode upon traveling of a vehicle in a SMART DRIVE MODE according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to a same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On another hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying exemplary drawings, and these exemplary embodiments may be implemented in various different forms by those skilled in the art to which various exemplary embodiments of the present invention pertains as an example, and thus are not limited to the exemplary embodiments described herein.

Figure 2A:
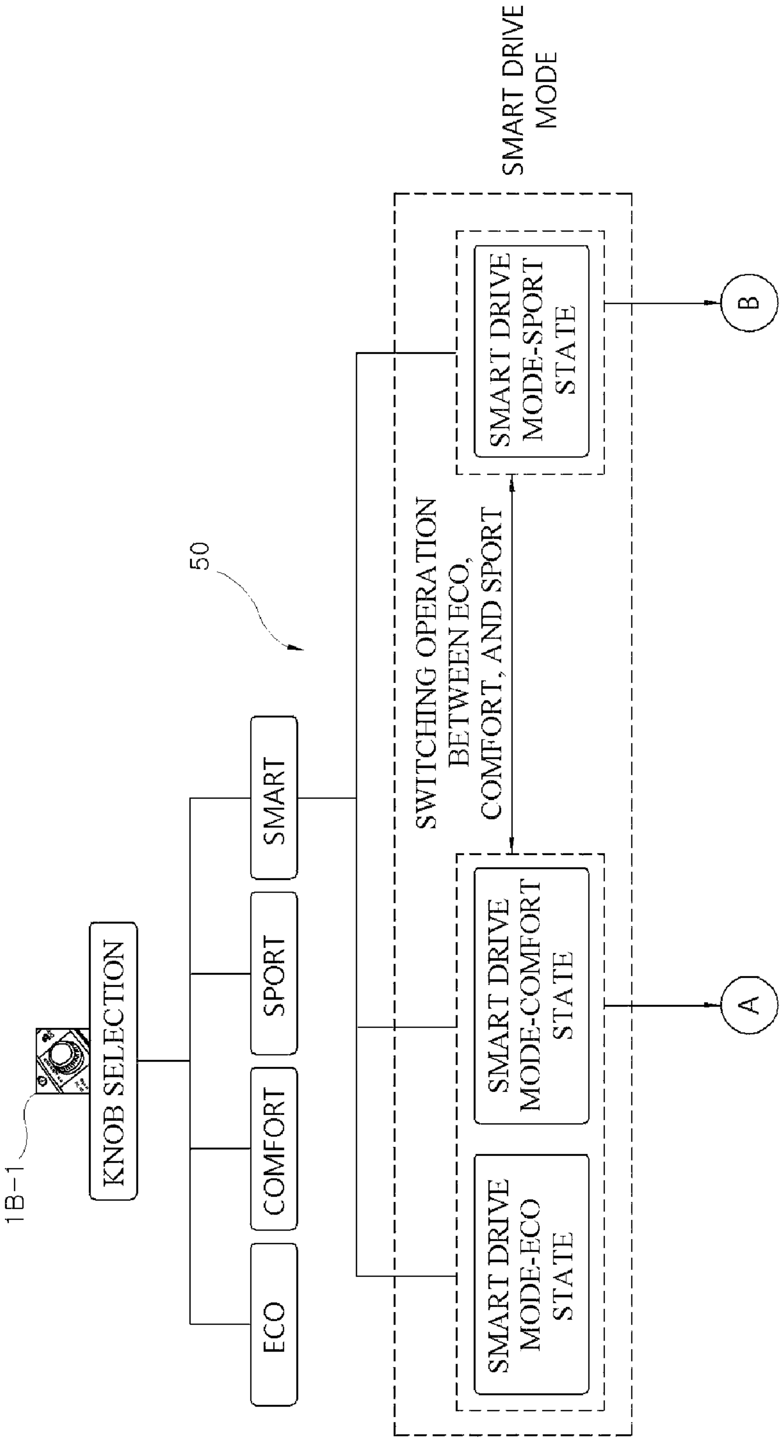
FIG. 2A and FIG. 2B illustrate an example of implementing the method for interlocking the engine exhaust sound with the traveling mode illustrated in FIG. 1 with a hierarchy structure of a control logic or program which interlocks the SMART DRIVE MODE with any one of the SMART DRIVE MODE-ECO state, the SMART DRIVE MODE-COMFORT state, and the SMART DRIVE MODE-SPORT state.
Figure 2B:
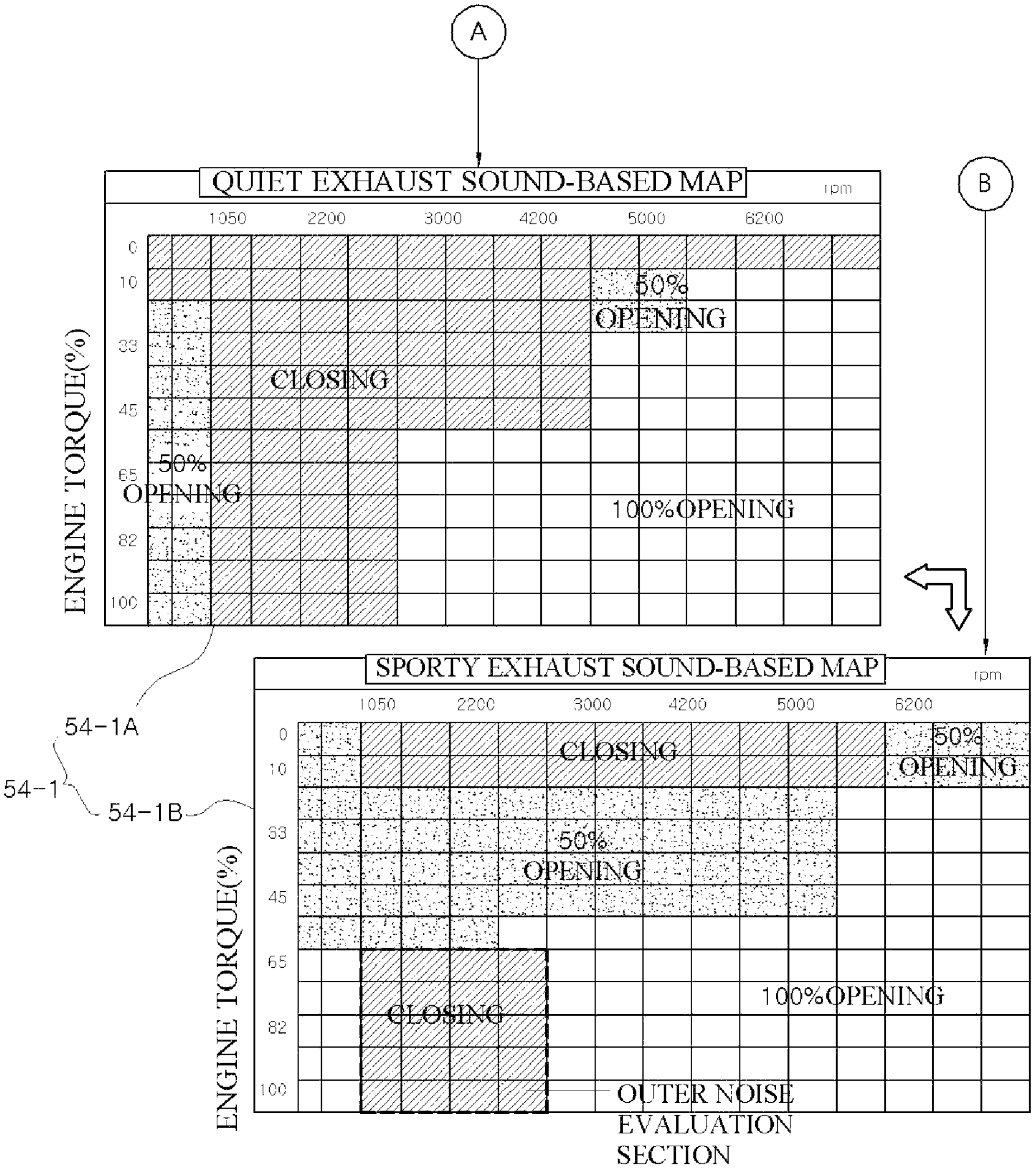

FIGS. 1, 2A and 2B illustrate a method for interlocking an engine exhaust sound with a vehicle traveling mode implemented by a vehicle exhaust system.

Referring to FIG. 1, a method for interlocking an engine exhaust sound with a vehicle traveling mode implements a SMART SHIFT control (S40, S50-1, S50-2, S50-3, S60-1, S60-2) which automatically switches an exhaust sound from a sporty exhaust sound to a quiet exhaust sound or from the quiet exhaust sound to the sporty exhaust sound based on an accelerator pedal stroke in a SMART DRIVE MODE (S10, S20) after a vehicle is started-up (ON).

Figure 3:
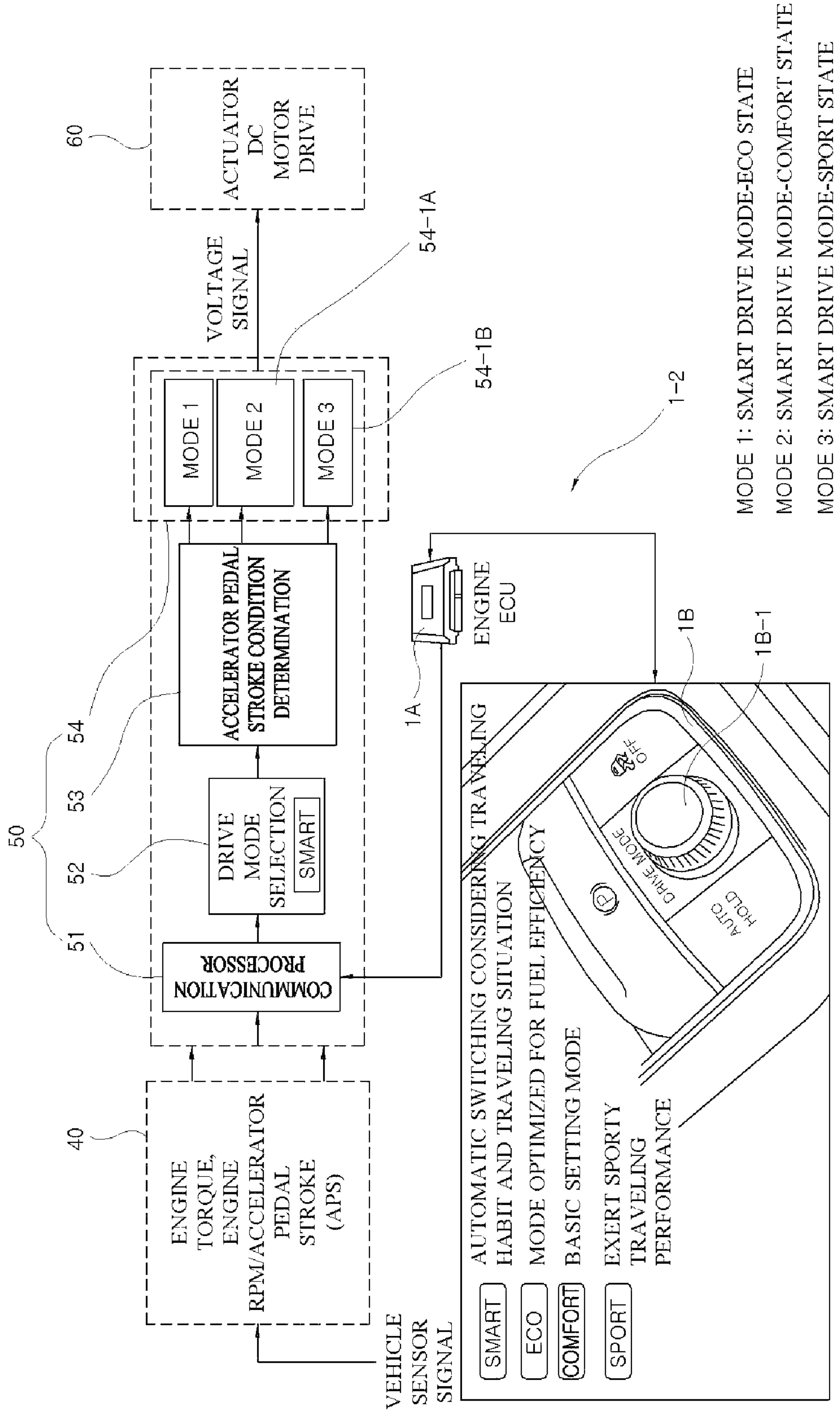
FIG. 3 illustrates an example of a configuration of an exhaust sound change system for implementing the method for interlocking the engine exhaust sound with the traveling mode illustrated in FIG. 1 and FIG. 2.

As illustrated in FIG. 2A and FIG. 2B, a method for interlocking an engine exhaust sound with a vehicle traveling mode exemplarily provides that a control thereof is implemented by a logic or program hierarchy structure so that the SMART DRIVE MODE (S10, S20) provides a SMART DRIVE MODE using a mode selection device 1B-1 (see FIG. 3).

The SMART SHIFT control (S40, S50-1, S50-2, S50-3, S60-1, S60-2) is classified into a SMART DRIVE MODE automatic switching control (S40, S50-1, S50-2, S50-3) and a switching mode exhaust sound matching control (S60-1, S60-2).

As an example, the SMART DRIVE MODE automatic switching control (S40, S50-1, S50-2, S50-3) selects, as the SMART DRIVE MODE, any one of a SMART DRIVE MODE-ECO state, a SMART DRIVE MODE-COMFORT state, and a SMART DRIVE MODE-SPORT state based on an accelerator pedal stroke.

Furthermore, the switching mode exhaust sound matching control (S60-1, S60-2) generates an exhaust sound by switching a sporty exhaust sound-based map 54-1B in the SMART DRIVE MODE-SPORT state and a quiet exhaust sound-based map 54-1A in the SMART DRIVE MODE-ECO state/the SMART DRIVE MODE-COMFORT state therebetween with respect to the SMART DRIVE MODE-ECO state, the SMART DRIVE MODE-COMFORT state, and the SMART DRIVE MODE-SPORT state, which are changed during traveling of a vehicle. In the instant case, the change in the engine exhaust sound is performed by an electronic variable valve 30 (see FIG. 4, FIG. 5, FIG. 6, FIG. 7, and FIG. 8) for varying the flow rate of the exhaust gas, which will be described later.

Therefore, the method for interlocking the engine exhaust sound with the traveling mode may implement the feature in which the exhaust sounds of left/right mufflers 20-1, 20-2 interlocked with the electronic variable valve 30 may be generated in the SMART SHIFT control, automatically changing the engine exhaust sound even without the driver's mode operation.

Meanwhile, FIG. 3, FIG. 4, FIG. 5, FIG. 6 and FIG. 7 illustrate an example of implementing an exhaust sound change system 1-2 applied to an exhaust system 1-1 for a vehicle 1 in which the method for interlocking the engine exhaust sound with the traveling mode is implemented.

Referring to FIG. 3, the engine exhaust sound change system 1-2 drives an actuator (or a DC motor) of the electronic variable valve 30 by confirming an engine revolutions per minute (RPM), an accelerator pedal stroke (APS), and an engine torque among vehicle sensor signals of the vehicle 1 from an input condition logic 40 in a mode recognition logic 50, and then transferring a voltage signal of 9 to 16 V as a motor application voltage to an output driving logic 60 based on the accelerator pedal stroke. Hereinafter, the mode recognition logic 50 is actually implemented by a controller, a processor, or a central processing unit having a memory for storing a logic or a program but for convenience of explanation, will be described by a control logic or a program which is configured to perform the method for interlocking the engine exhaust sound with the traveling mode.

The mode recognition logic 50 includes: a communication processor 51, a mode processor 52, an accelerator pedal signal processor 53, and a variable valve operation map 54. In the instant case, the processor may be a processor having the memory for storing a logic or a program performing a control to execute the logic.

As an example, the communication processor 51 confirms the input conditions of the engine RPM, the accelerator pedal stroke, and the engine torque from the logic 40. The mode processor 52 confirms when the SMART DRIVE MODE has been selected from the mode selection device 1B-1 of a traveling mode system 1B. The accelerator pedal signal processor 53 is configured to perform the SMART SHIFT control by confirming the accelerator pedal stroke condition in the SMART DRIVE MODE.

In the SMART SHIFT control, the following mode enters according to the accelerator pedal stroke condition.

[Below]

SMART DRIVE MODE-SPORT state: accelerator pedal stroke (APS)>25 to 30%

SMART DRIVE MODE-ECO state: accelerator pedal stroke (APS)<5 to 10%

SMART DRIVE MODE-COMFORT state: accelerator pedal stroke (APS)>5 to 10%

Therefore, the SMART DRIVE MODE automatically switches the engine exhaust sound while the state is switched according to a change in the accelerator pedal stroke as in the SMART DRIVE MODE-ECO state↔the SMART DRIVE MODE-COMFORT state↔the SMART DRIVE MODE-SPORT state in the SMART SHIFT control depending on the accelerator pedal stroke.

As an example, the variable valve operation map 54 is classified into the quiet exhaust sound-based map 54-1A in which the engine exhaust sound is matched according to the SMART DRIVE MODE-ECO state and the SMART DRIVE MODE-COMFORT state, and the sporty exhaust sound-based map 54-1B in which the engine exhaust sound depending on the SMART DRIVE MODE-SPORT state is matched. In the instant case, the quiet exhaust sound-based map 54-1A and the sporty exhaust sound-based map 54-1B will be described in detail later with reference to FIG. 8.

Furthermore, when the mode selection device 113-1 of the traveling mode system 1B is recognized through an engine electronic control unit (ECU) 1A for transmitting data to the mode recognition logic 50, the engine exhaust sound change system 1-2 is driven by sending a voltage signal to the electronic variable valve via pulse width modulation (PWM) communication.

As an example, the traveling mode system 1B provides the feature expressed in Table 1 with respect to the SMART DRIVE MODE selected by the mode selection device 1B-1.

TABLE 1

| Customer's driving tendency Sporty index | | | | | |
|---|---|---|---|---|---|
| EXTRA MILD 0% | MILD | NORMAL | | SPORTY | EXTRA SPORTY 100% |
| | ← Automatic switching | | | | → |
| Traveling mode phase 3 | SMART ECO | SMART COMFORT | | SMART SPORT | |
| Shift pattern phase 5 | High fuel efficiency type | Fuel efficiency type | Standard type | Acceleration type | Rapid turning type |
| Engine torque phase 3 | Fuel efficiency type | | Standard type | Responsive type | |
| Coasting neutral control | Operation (intelligence type) | | Non-operation | | |
| Suspension phase 2 | Soft | | | | Hard |

Therefore, the SMART DRIVE MODE may reflect the driving tendency and habit by setting three types of the SMART DRIVE MODE-ECO state, the SMART DRIVE MODE-COMFORT state, and the SMART DRIVE MODE- SPORT state as a sub mode, and automatically switch the mode such as the SMART DRIVE MODE-ECO state↔the SMART DRIVE MODE-COMFORT state↔the SMART DRIVE MODE-SPORT state in the SMART SHIFT control depending on the accelerator pedal stroke without the driver's intervention or selection.

As an example, through the SMART SHIFT control, the SMART DRIVE MODE may 1) determine the long-term habit and momentary intention of the driver, changing not only a shift time point but also riding comfort by adjusting an attenuation force depending on the traveling mode of an electronic controlled suspension (ECS) interlocked with the engine output, and 2) interlock the actually physical exhaust sound with the traveling quality and the traveling mode, providing the differentiated exhaust sound without the driver's operation.

Figure 4:
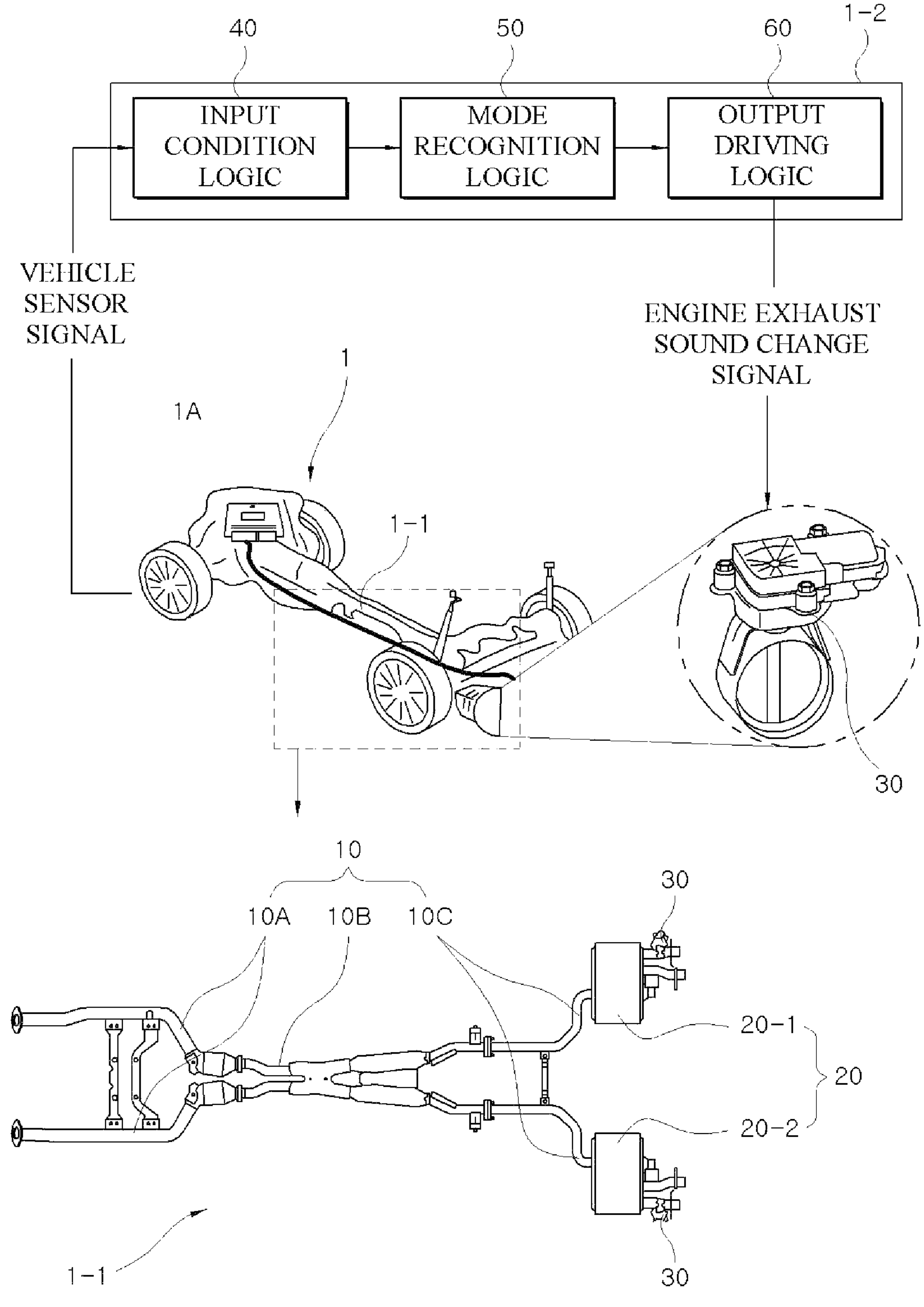
FIG. 4 is a diagram illustrating a configuration of an exhaust system for a smart vehicle connected to the engine exhaust sound change system illustrated in FIG. 3.

Referring to FIG. 4, the vehicle 1 includes: the exhaust system 1-1 controlled by the engine exhaust sound change system 1-2 to vary the exhaust sound.

As an example, the exhaust system 1-1 includes: an exhaust line 10 through which the exhaust gas generated by the combustion of an engine flows, a muffler 20 including a left muffler 20-1 and a right muffler 20-2 provided on the edge portion of the exhaust line 10 to discharge the exhaust gas to the outside and the electronic variable valve 30 mounted on the exhaust gas outlets (see first and second tail pipes 28, 29 illustrated in FIG. 2A and FIG. 2B) of each of the left/right mufflers 20-1, 20-2. Therefore, the exhaust system 1-1 is characterized as an exhaust system for a smart vehicle.

The exhaust line 10 is classified into an engine side exhaust pipe 10A, an intermediate exhaust pipe 10B, and a muffler side exhaust pipe 10C connected to one another, and each of the engine side exhaust pipe 10A, the intermediate exhaust pipe 10B, and the muffler side exhaust pipe 10C forms a layout as a double pipe structure configuring a pair of two pipes.

Therefore, the left muffler 20-1 of the left/right mufflers 20-1, 20-2 is mounted on one pipe of two pipes of the muffler side exhaust pipe 10C, and the right muffler 20-2 is mounted on another pipe of two pipes of the muffler side exhaust pipe 10C.

Furthermore, the electronic variable valve 30 is provided on each of the left muffler 20-1 and the right muffler 20-2, and the installation location of each of the left muffler 20-1 and the right muffler 20-2 is applied to a first tail pipe 28 (e.g., see FIG. 5) of the first and second tail pipes 28, 29 through which the exhaust gas is discharged from each of the left muffler 20-1 and the right muffler 20-2.

The electronic variable valve 30 is controlled by an engine exhaust sound change signal output from the mode recognition logic 50 of the engine exhaust sound change system 1-2.

Figure 5:
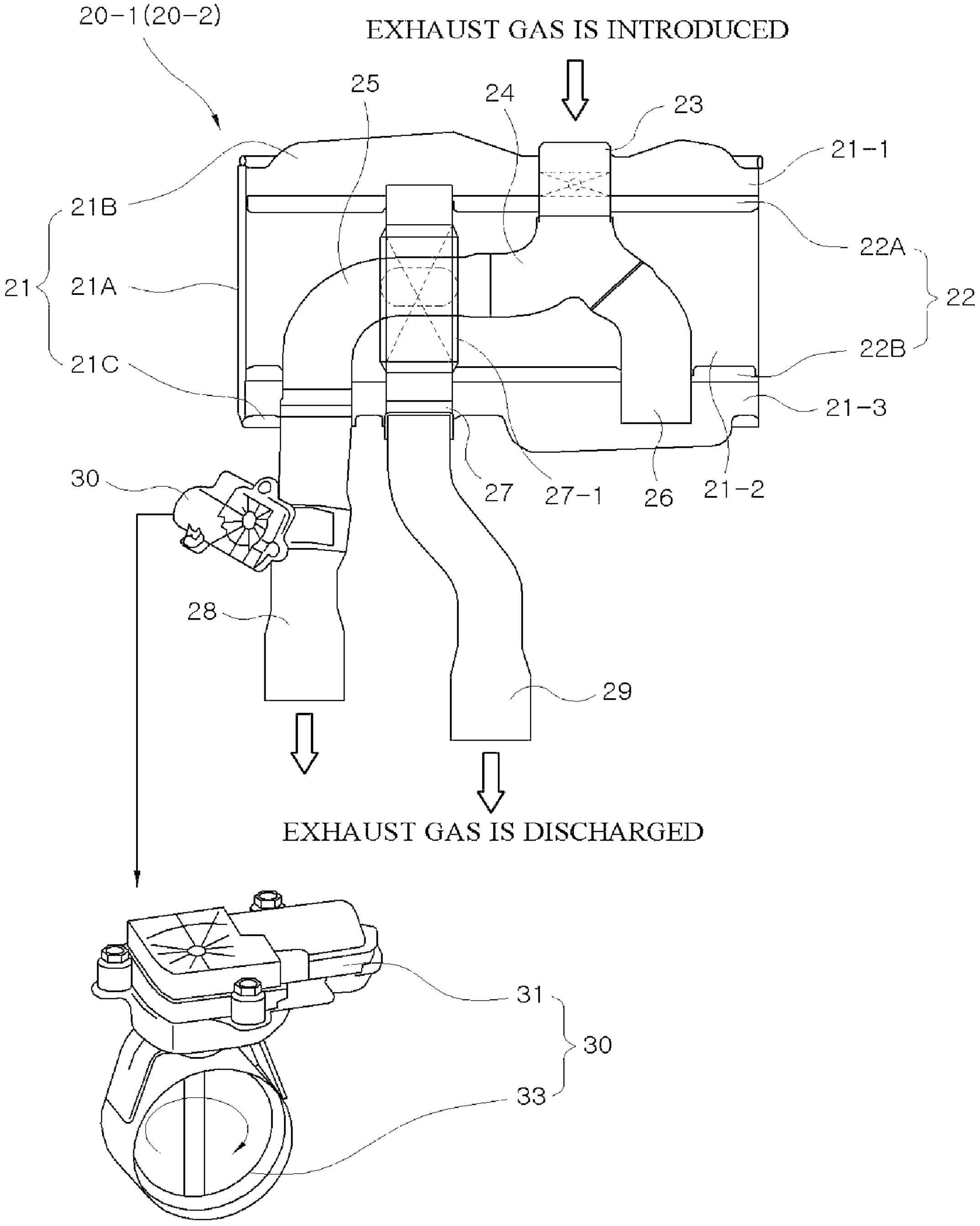
FIG. 5 is a diagram illustrating an external configuration of an electronic variable valve-connected muffler applied to a vehicle exhaust system according to various exemplary embodiments of the present invention.
Figure 6:
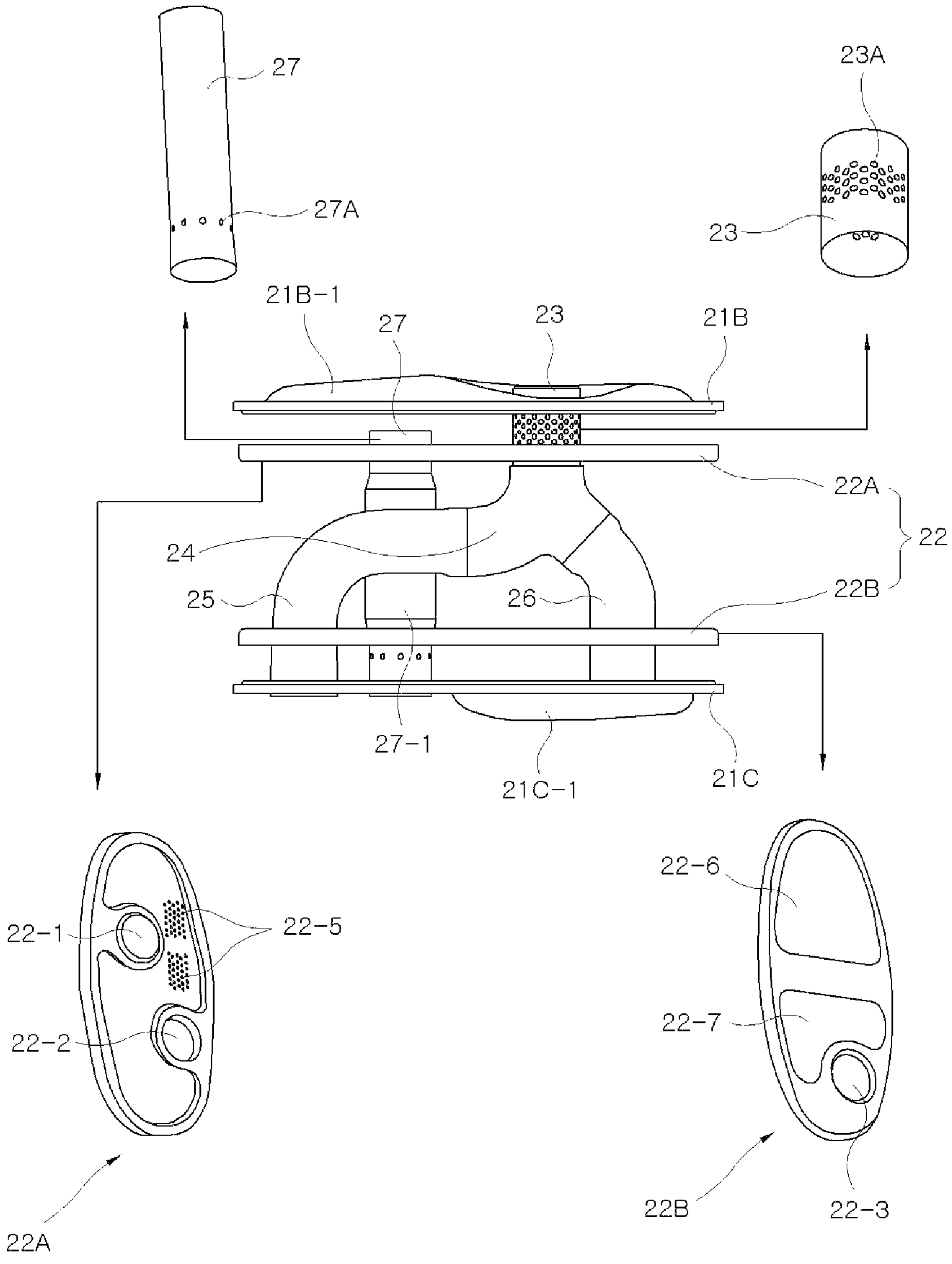
FIG. 6 is a diagram illustrating an internal configuration of a muffler applied to the vehicle exhaust system according to various exemplary embodiments of the present invention.
Figure 7:
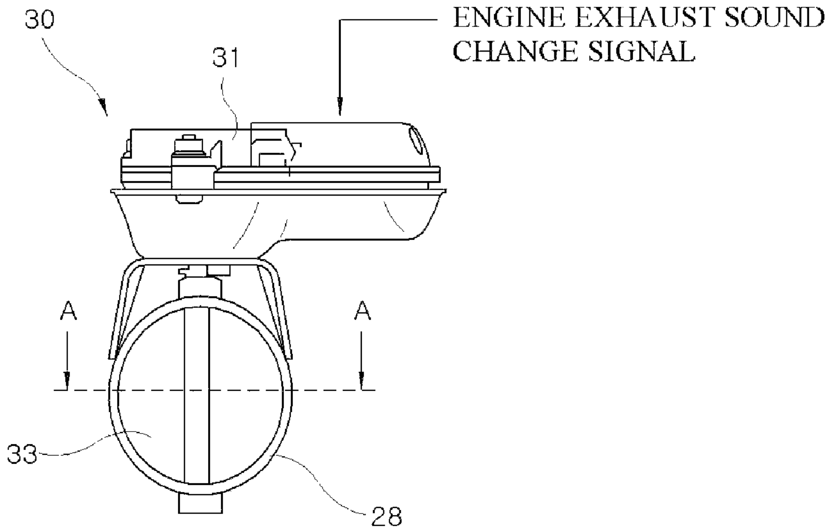
FIG. 7 is a diagram illustrating a configuration of the electronic variable valve applied to the exhaust system according to various exemplary embodiments of the present invention.
Figure 7:
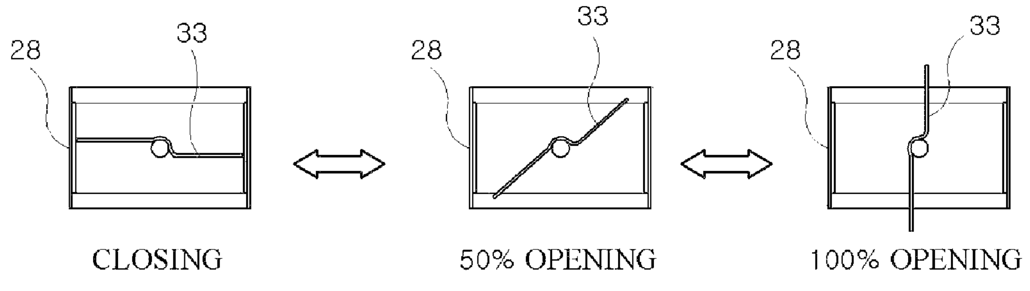

Meanwhile, FIG. 5, FIG. 6 and FIG. 7 illustrate detailed configurations of the left muffler 20-1, the right muffler 20-2, and the electronic variable valve 30.

Referring to FIG. 5 and FIG. 6, each of the left muffler 20-1 and the right muffler 20-2 includes: a housing 21, a baffle 22, an inlet tube 23, a 1IN-2OUT Y-shaped tube 24, 25, 26, a second external connection tube 27, the first tail pipe 28, and the second tail pipe 29 as components of the muffler, and the electronic variable valve 30 includes: a valve driving device 31 and a valve gate 33 as components of the valve.

Therefore, hereinafter, the components of the muffler will be described without distinction between the left muffler 20-1 and the right muffler 20-2, and the components of the valve will be described without distinction between the electronic variable valve 30 applied to the left muffler 20-1 and the electronic variable valve 30 applied to the right muffler 20-2.

The housing 21 includes: a housing body 21A forming an internal space by closing one portion (i.e., the upper portion of the housing body 21A) with an upper plate 21B and closing another portion (i.e., the lower portion of the housing body 21A) with a lower plate 21C. In the instant case, the upper portion of the housing body 21A means a direction in which the exhaust gas is introduced into the housing 21, and the lower portion of the housing body 21A means a direction in which the exhaust gas is discharged from the housing 21.

The upper plate 21B presses the housing 21 to form an upper expansion space portion 21B-1 protruding outward, and the lower plate 21C presses the housing 21 to form a lower expansion space portion 21C-1 protruding outward. Therefore, each of the upper expansion space portion 21B-1 and the lower expansion space portion 21C-1 expands an internal space volume of the housing 21.

The baffle 22 includes: a pair of a first baffle 22A and a second baffle 22B to partition the internal space of the housing 21. That is, the first and second baffles 22A, 22B partition the internal space of the housing 21 into a first chamber 21-1 in which the first baffle 22A and the upper plate 21B face each other, a second chamber 21-2, in which the first baffle 22A and the second baffle 22B face each other, and a third chamber 21-3, in which the second baffle 22B and the lower expansion space portion 21C-1 face each other.

To, the present end, the first baffle 22A is coupled to the inlet tube 23 by one tube hole 22-1 of two perforated tube holes 22-1, 22-2 and coupled to the second external connection tube 27 by another tube hole 22-2 thereof. Furthermore, the second baffle 22B is coupled to an extension tube 26 by one perforated tube hole 22-3.

The first baffle 22A perforates the peripheries of the tube holes 22-1, 22-2 using a punching hole 22-5 having a small diameter as a punching hole group, forming a fine passage through which a portion of the exhaust gases is discharged from the first chamber 21-1 to the second chamber 21-2. On another hand, the second baffle 22B forms a pair of a first open space portion 22-6, which is a space through which the first external connection tube 25 passes, and a second open space portion 22-7, which is a space through which the second external connection tube 27 passes, forming an opening passage through which a portion of the exhaust gases is discharged from the second chamber 21-2 to the third chamber 21-3.

The inlet tube 23 is fixed to the hole of the upper plate 21B in a state of being coupled to the tube hole 22-1 of the first baffle 22A and thus connected to the muffler side exhaust pipe 10C outside the housing 21, and operates as a gas inlet into which the exhaust gas flowing to the muffler side exhaust pipe 10C is introduced.

The inlet tube 23 perforates the circumference of the circle using a punching hole 23A having a small diameter as a punching hole group in an intermediate section, sending the exhaust gas to a branch tube 24 and sending a portion of the exhaust gases to the first chamber 21-1.

The 1IN-2OUT Y-shaped tube 24, 25, 26 includes: the branch tube 24, the first external connection tube 25, and the extension tube 26.

As an example, the branch tube 24 is formed in an "inverse Y" shape to branch the exhaust gas introduced in a direction through one inlet into two directions through two outlets and send the exhaust gas. That is, the branch tube 24 connects one inlet (i.e., 1IN) to the inlet tube 23 to introduce the exhaust gas, and connects two outlets (i.e., 2OUT) to the first external connection tube 25 and the extension tube 26, respectively to send the exhaust gas.

The first external connection tube 25 is formed in an elbow pipe shape having a smoothly curved bending structure, and thus fitted into a hole of the lower plate 21C through the first open space portion 22-6 of the second baffle 22B at a location of the branch tube 24, and connected to the first tail pipe 28 outside the housing 21 to form a valve interference path. In the instant case, the valve interference path forms a first exhaust sound tone change section X (see FIG. 9) with respect to the exhaust gas discharged to the first tail pipe 28.

On another hand, the extension tube 26 is formed in a substantially straight pipe shape, forming a tube separation interval with the expansion space portion 21C-1 of the lower plate 21C through the tube hole 22-3 of the second baffle 22B at a location of the branch tube 24. In the instant case, the tube separation interval forms a third exhaust sound tone change section Z (see FIG. 9) with respect to the exhaust gas diffused into the muffler.

Furthermore, the first external connection tube 25 and the extension tube 26 are press-fitted and coupled to the branch tube 24 or coupled to the branch tube 24 by welding to be integrated.

The second external connection tube 27 is formed in a straight pipe shape, has another end portion fitted into the hole of the lower plate 21C through the second open space portion 22-7 of the second baffle 22B in a state of having one end portion fitted into the tube hole 22-2 of the first baffle 22A, and is connected to the second gas discharge tube 29 outside the housing 21.

The second external connection tube 27 perforates the circumference of the circle using a punching hole 27A having a small diameter as a punching hole group in an edge portion section to send the exhaust gas to the second gas discharge tube 29 and send a portion of the exhaust gases to the third chamber 21-3, forming a hole interference path. In the instant case, the hole interference path forms a second exhaust sound tone change section Y (see FIG. 9) with respect to the exhaust gas discharged to the second gas discharge tube 29.

Furthermore, the second external connection tube 27 is surrounded by a double tube 27-1 having a short length not covering the punching hole 27A. In the instant case, the double tube 27-1 is made of a same material as the second external connection tube 27 or may also employ a foam mat having an excellent thermal resistance.

Referring to FIG. 7, the electronic variable valve 30 includes: the valve driving device 31 driven by an engine exhaust sound change signal of the output driving logic 60 connected to the mode recognition logic 50, and a valve gate 33 for changing a valve opening by operation of the valve driving device 31.

To, the present end, the valve driving device 31 includes: an electric control board for controlling an electric signal, a power source using an actuator, a motor side rod (e.g., screw) for converting rotation into a linear motion, a gear mechanism (e.g., worm gear and gear wheel) for converting a linear motion into rotation, a housing, and the like therein, and the valve gate 33 is located outside the housing of the valve driving device 31 to change a valve stroke with a rotational angle of a circular rotation plate receiving the rotation of an actuator or a motor toward the valve. In the instant case, the electric circuit board, the actuator, the motor side rod, the gear mechanism, the housing, and the like are general components of the electronic variable valve 30.

As an example, if the electronic variable valve 30 employs the DC motor as the actuator, the DC motor is driven by use of an engine exhaust sound change signal of 9 to 16V as the motor application voltage, the motor side rod (e.g., screw) converts the motor rotation into a linear motion and then converts the linear motion into the rotation of the gear wheel through the worm gear, and the rotation of the gear wheel rotates the valve gate 33 coupled to the gear wheel so that the cross-sectional area of the exhaust gas passage of the first tail pipe 28 is changed by the valve opening of closing (0% opening)↔50% opening↔100% opening.

Hereinafter, the method for interlocking the engine exhaust sound with the traveling mode illustrated in FIG. 1 will be described in detail with reference to FIGS. 8A to 12. In the instant case, the control subject is the engine ECU 1A configuring the engine exhaust sound change system 1-2 or the mode recognition logic 50 interlocked therewith, and the control object is the electronic variable valve 30.

Referring to FIG. 1, the engine ECU 1A is configured to perform recognizing start ON (S10), selecting a vehicle traveling mode (S20), and confirming a SMART DRIVE MODE (S30).

Referring to FIG. 3, the mode recognition logic 50 is connected to the engine ECU 1A to utilize the communication processor 51 and the mode processor 52.

As an example, the mode processor 52 reads an IG_Key ON, which is a start detection signal of the engine ECU 1A transmitted to the input condition logic 40 through the communication processor 51. Furthermore, the mode processor 52 reads the engine RPM, the accelerator pedal stroke, and the engine torque among the vehicle speed, engine load, engine coolant temperature, engine RPM, accelerator pedal stroke, and engine torque of the engine ECU 1A transmitted to the input condition logic 40 through the communication processor 51. Furthermore, the mode processor 52 recognizes a selection signal of the SMART DRIVE MODE generated by the mode selection device 1B-1 of the traveling mode system 1B transmitted to the input condition logic 40 through the engine ECU 1A.

Therefore, the mode recognition logic 50 confirms the engine start (S10) with the start ON of the IG_Key ON, and is configured to perform the confirming of the SMART DRIVE MODE (S20, S30) through the mode selection device 1B-1.

As a result, the mode recognition logic 50 recognizes the current traveling state of the vehicle 1 as the SMART DRIVE MODE (S30) and switches the traveling state to the SMART SHIFT control (S40, S50-1, S50-2, S50-3, S60-1, S60-2).

Next, the mode recognition logic 50 is configured to perform the SMART SHIFT control (S40, S50-1, S50-2, S50-3, S60-1, S60-2) as the SMART DRIVE MODE automatic switching control (S40, S50-1, S50-2, S50-3) and the switching mode exhaust sound matching control (S60-1, S60-2).

As an example, the SMART DRIVE MODE automatic switching control (S40, S50-1, S50-2, S50-3) includes: confirming the accelerator pedal stroke (S40), entering the SMART DRIVE MODE-SPORT state (S50-1), entering the SMART DRIVE MODE-ECO state (S50-2), and entering the SMART DRIVE MODE-COMFORT state (S50-3).

The mode recognition logic 50 applies the following equation to the confirming of the accelerator pedal stroke (S40) through the accelerator pedal processor 53.

Equation to which the sport exhaust sound is applied: A>α?

Equation to which the quiet exhaust sound is applied: A<β?

where "A" refers to an accelerator pedal stroke detection value, "α" refers to a first threshold of the accelerator pedal stroke and applies the APS of about 25 to 30%, whereas "β" refers to a second threshold of the accelerator pedal stroke and applies the APS of about 5 to 10%, and ">" refers to an inequality sign indicating the size relationship between two values.

Referring to FIG. 3, the mode recognition logic 50 confirms whether the accelerator pedal stroke detection value A is a value larger or smaller than the first threshold (a) of the accelerator pedal stroke, and confirms whether the accelerator pedal stroke detection value A is a value larger or smaller than the second threshold (0) of the accelerator pedal stroke through the accelerator pedal processor 53.

As a result, the mode recognition logic 50 enters the SMART DRIVE MODE-SPORT state (S50-1) if the condition of the "A>α" is satisfied, and enters the SMART DRIVE MODE-ECO state (S50-2) if the condition of the "A<β" is satisfied, whereas the mode recognition logic 50 enters the SMART DRIVE MODE-COMFORT state (S50-3) if the condition is not satisfied (i.e., A>β).

As an example, the switching mode exhaust sound matching control (S60-1, S60-2) includes: generating a sporty exhaust sound-based map applied exhaust sound for the SMART DRIVE MODE-SPORT state (S60-1), and generating a quiet exhaust sound-based map applied exhaust sound for the SMART DRIVE MODE-ECO state and the SMART DRIVE MODE-COMFORT state (S60-2).

Furthermore, the mode recognition logic 50 receives a change value of the accelerator pedal stroke detected by the engine ECU 1A through the input condition logic 40 to continuously process the change value in the accelerator pedal processor 53.

Accordingly, each of the sporty exhaust sound-based map 54-1B and the quiet 10 exhaust sound-based map 54-1A automatically matches with closing (0% opening)↔50% opening↔100% opening depending on the change in the accelerator pedal stroke in a line diagram of engine torque-engine RPM so that the valve opening of the electronic variable valve 30 is automatically changed according to the change in the accelerator pedal stroke.

Meanwhile, FIGS. 8A, 8B and 8C to 12 illustrate an example of the change in the flow of the exhaust gas of the muffler 20 according to the change in the valve opening of the electronic variable valve 30 and generating the quiet exhaust sound and the sporty exhaust sound generated by the change in the flow of the exhaust gas.

Figure 8A:
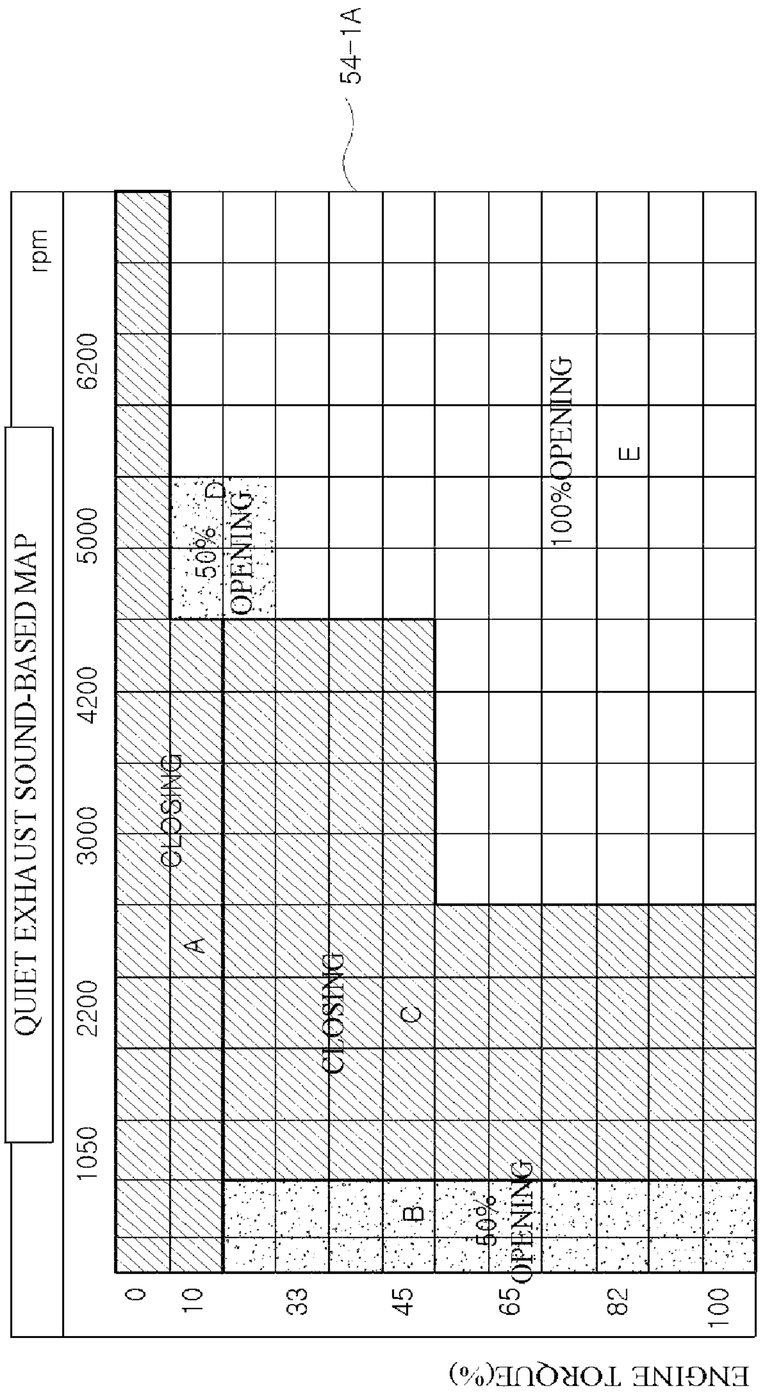
FIG. 8A, FIG. 8B and FIG. 8C illustrate an example of a configuration of a quiet exhaust sound-based map and a sporty exhaust sound-based map matching with any one valve opening of the closing, 50% opening, and 100% opening of the electronic variable valve for changing the engine exhaust sound according to various exemplary embodiments of the present invention.
Figure 8B:
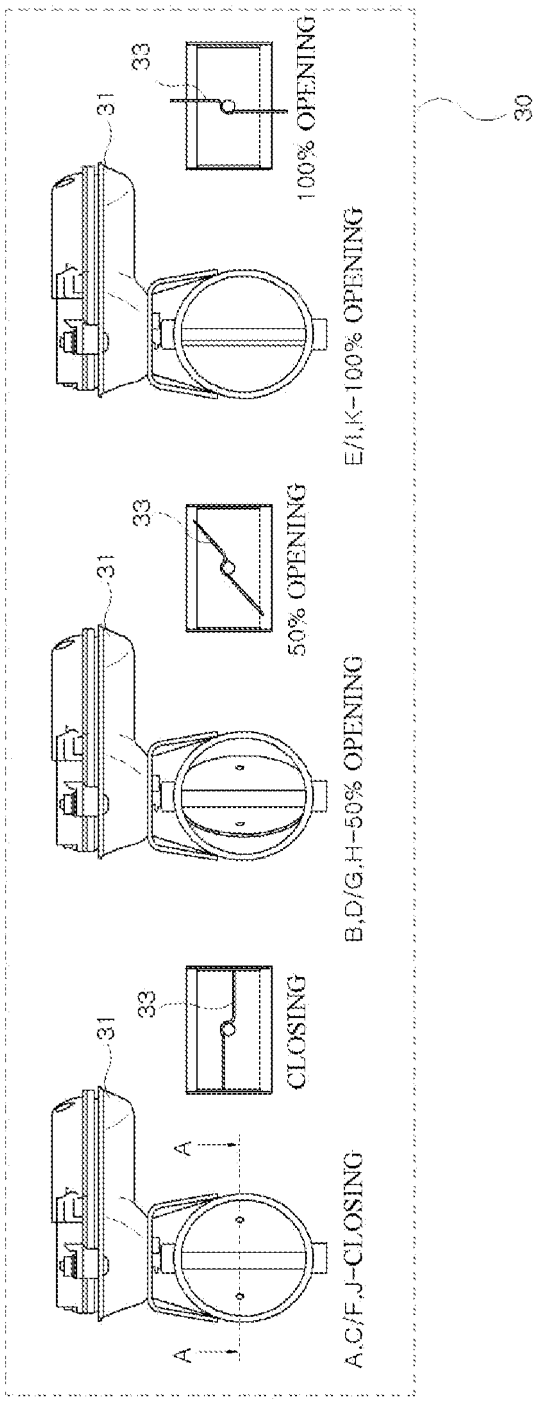
Figure 8C:
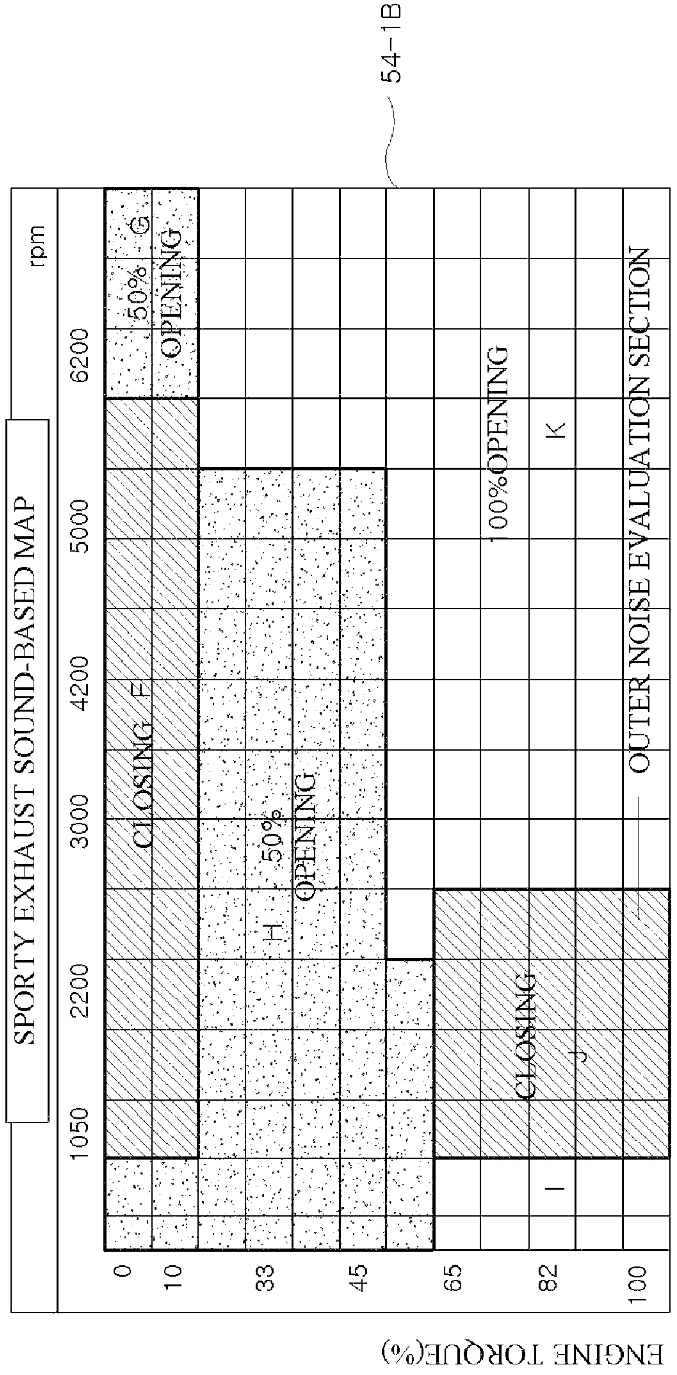

FIG. 8A, FIG. 8B and FIG. 8C illustrate that the valve opening of the electronic variable valve 30 is changed to any one of the closing (0% opening), the 50% opening, and the 100% opening in an engine torque area of 0 to 100% and an engine RPM area of 0 to 7000 RPM of the quiet exhaust sound-based map 54-1A and the sporty exhaust sound-based map 54-1B, and automatically changed such as closing (0% opening)↔50% opening↔100% opening according to the change in the accelerator pedal stroke.

As an example, in the case of the quiet exhaust sound-based map 54-4A, in the engine torque area of 0 to 100% and the engine RPM area of 0 to 7000 RPM of the quiet exhaust sound-based map 54-1A, the electronic variable valve 30 applies the closing (0% opening) to a section A and a section C, applies the 50% opening to a section B and a section D, and applies the 100% opening to a section E.

The section A is a section in which the engine torque in an area equal to or smaller than about 20% is matched with the engine RPM in an area equal to or smaller than 4600 RPM and the engine torque in an area equal to or smaller than about 10% with the engine RPM in an area (i.e., the entire area) equal to or smaller than 7600 RPM, and the section C is a section matching the engine torque in an area of about 20 to 100% with the engine RPM in an area of about 1050 to 2600 RPM and the engine torque in an area of about 20 to 40% with the engine RPM in an area of about 1050 to 4600 RPM.

Furthermore, the section B is a section matching the engine torque in an area of about 20 to 30% with the engine RPM in an area equal to or smaller than about 1050 RPM, and the section D is a section matching the engine torque in an area of about 10 to 30% with the engine RPM in an area of about 4600 to 5400 RPM.

Furthermore, the section E is a section matching the engine torque in an area of about 10 to 30% with the engine RPM in an area of about 5400 to 7000 RPM, the engine torque in an area of about 30 to 50% with the engine RPM in an area of about 4600 to 7000 RPM, and the engine torque in an area of about 50 to 100% with the engine RPM in an area of about 2600 to 7000 RPM.

Therefore, in each of the sections A, B, C, D, E, the exhaust sounds of the left/right mufflers 20-1, 20-2 are generated depending on the SMART DRIVE MODE-ECO state and the SMART DRIVE MODE-COMFORT state (S60-2) with the closing (0% opening), 50% opening, 100% opening of the electronic variable valve 30 according to the application of the quiet exhaust sound-based map.

On another hand, in the case of the sporty exhaust sound-based map 54-1B, the electronic variable valve 30 applies any one of the closing (0% opening), the 50% opening, and the 100% opening in the engine torque area of 0 to 100% and the engine RPM area of 0 to 7000 RPM in the sporty exhaust sound-based map 54-1B.

That is, the closing (0% opening) is applied to a section F and a section J in the engine torque-engine RPM line diagram, the 50% opening is applied to a section G and a section H, and the 100% opening is applied to a section I and a section K.

The section F is a section matching the engine torque in an area equal to or smaller than about 20% with the engine RPM in an area of about 1050 to 6200 RPM, and the section J is a section matching the engine torque in an area of about 65 to 100% with the engine RPM in an area of about 1050 to 2500 RPM.

Furthermore, the section G is a section matching the engine torque in the area of about 20% or less with the engine RPM in an area of about 6200 to 7000 RPM, and the section H is a section matching the engine torque in an area equal to or smaller than about 65% with the engine RPM in an area equal to or smaller than about 1050 RPM, the engine torque in an area of about 20 to 65% with the engine RPM in an area of about 1050 to 2200 RPM, and the engine torque in an area of about 20 to 55% with the engine RPM in an area of about 2200 to 5600 RPM.

Furthermore, the section I is a section matching the engine torque in an area of about 65 to 100% with the engine RPM in an area equal to or smaller than about 1050 RPM, and the section K is a section matching the engine torque in an area of about 20 to 50% with the engine RPM in an area of about 5500 to 7000 RPM, and the engine torque in an area of about 50 to 100% with the engine RPM in an area of about 2200 to 7000 RPM.

Therefore, in each of the sections F, G, H, I, K, the exhaust sounds of the left/right mufflers 20-1, 20-2 are generated depending on the SMART DRIVE MODE-SPORT state (S60-1) with the closing (0% opening), 50% opening, 100% opening of the electronic variable valve 30 according to the application of the sporty exhaust sound-based map.

Figure 9:
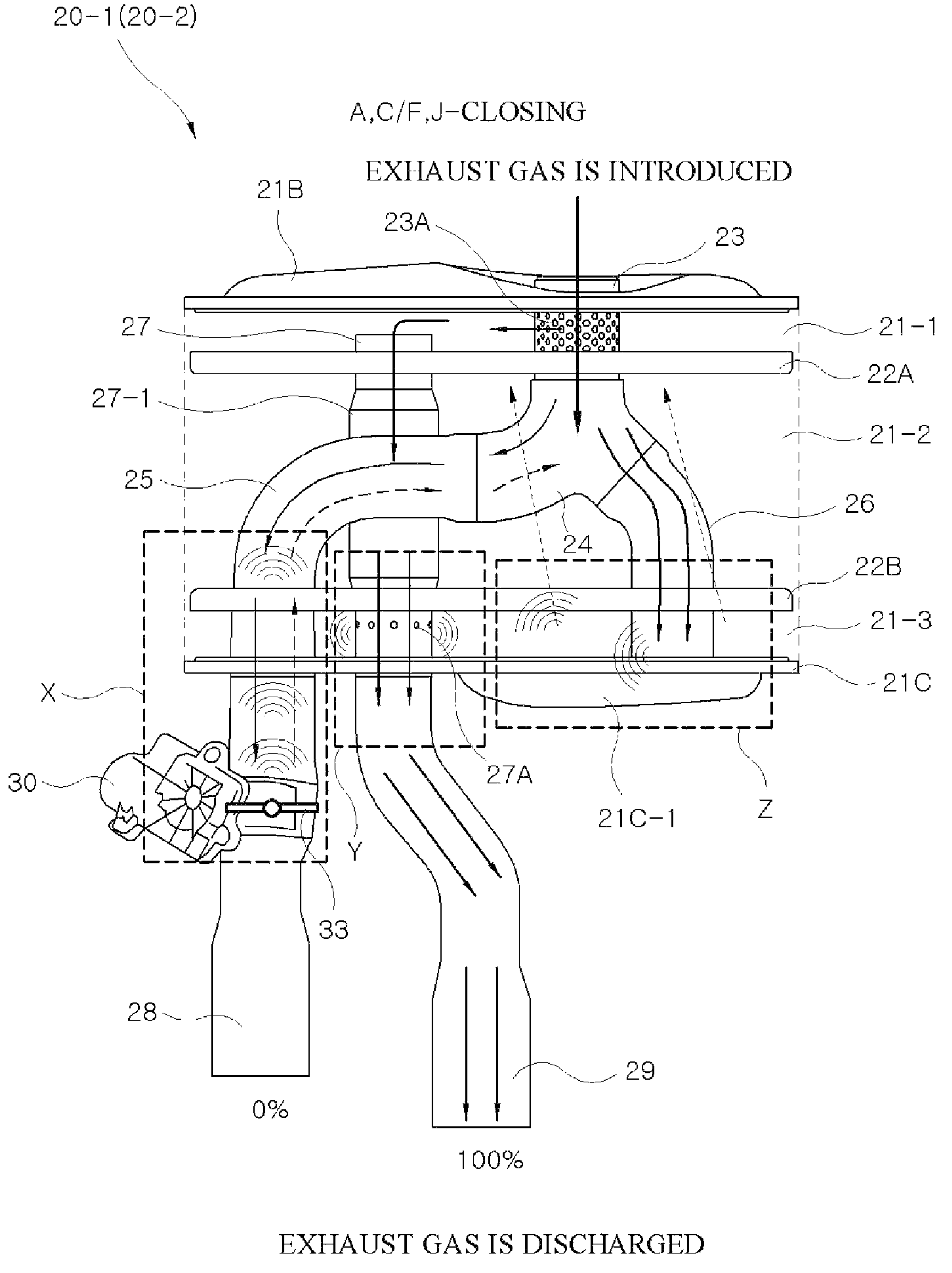
FIG. 9 illustrates an operation state of the muffler when the electronic variable valve is closed in any one state of the SMART DRIVE MODE-ECO state, the SMART DRIVE MODE-COMFORT state, and the SMART DRIVE MODE-SPORT state according to various exemplary embodiments of the present invention.
Figure 10:
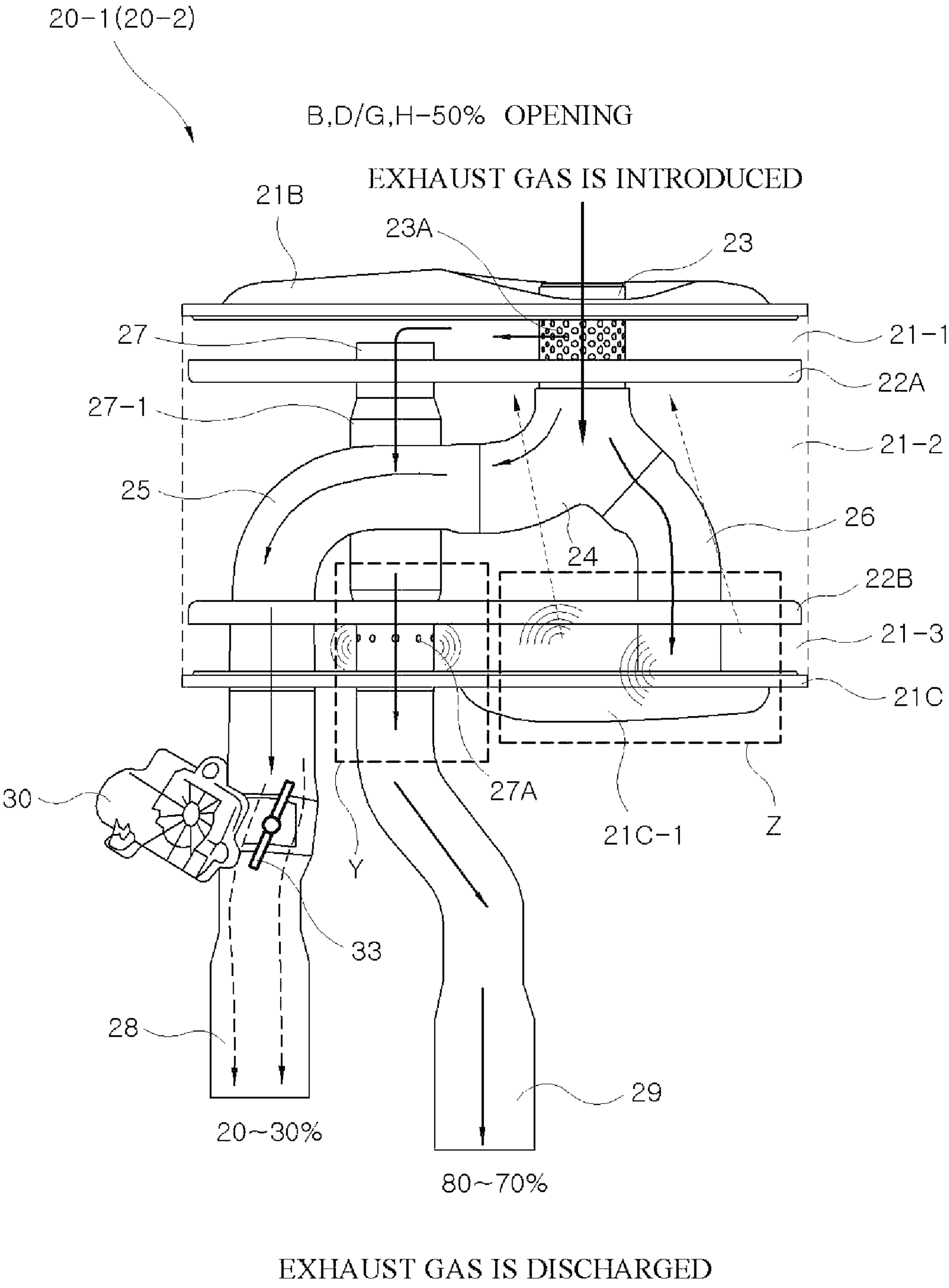
FIG. 10 illustrates an operation state of the muffler upon 50% opening of the electronic variable valve in any one state of the SMART DRIVE MODE-ECO state, the SMART DRIVE MODE-COMFORT state, and the SMART DRIVE MODE-SPORT state according to various exemplary embodiments of the present invention.
Figure 11:
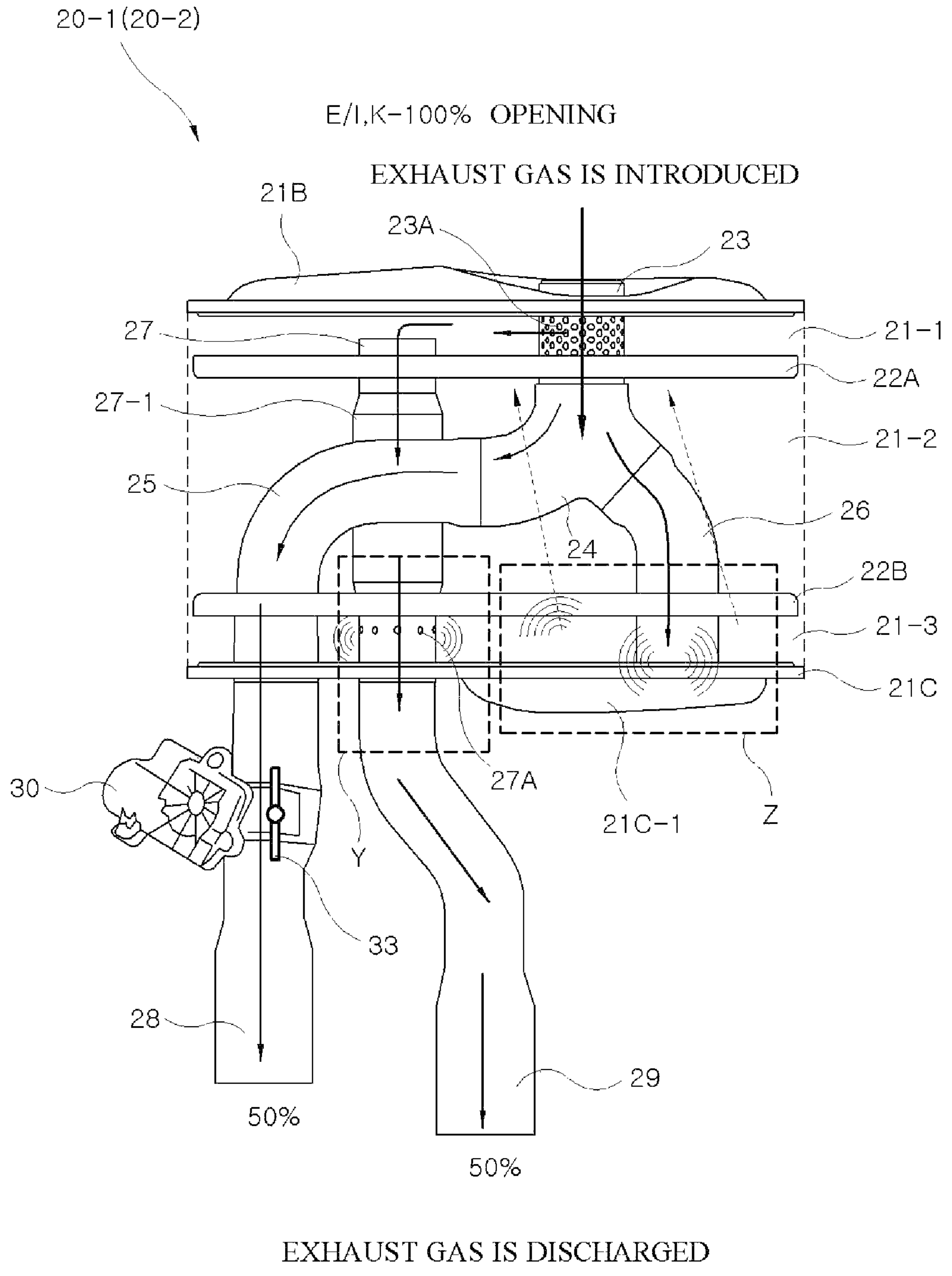
FIG. 11 illustrates an operation state of the muffler upon 100% opening of the electronic variable valve in FIG. 9.

Subsequently, FIG. 9, FIG. 10 and FIG. 11 illustrate an example in which the left/right mufflers 20-1, 20-2 differently generate the exhaust sounds in each of the closing (0% opening), the 50% opening, and the 100% opening of the valve gate 33 through the driving of the electronic variable valve (S90). In the instant case, each of the left/right mufflers 20-1, 20-2 has a same configurations and effects, and thus will be referred to as the muffler 20. Furthermore, the solid-lined/dotted-lined arrows mean the flow state of the exhaust gas and the wave shape means the diffusion and propagation state of the exhaust gas.

In FIGS. 9 to 11, the valve gate 33 of the electronic variable valve 30 closes the internal cross section of the first tail pipe 28 of the two first and second tail pipes 28, 29 (e.g., closing (0% opening)), opens a half of the internal cross section thereof (e.g., 50% opening), or fully opens the internal cross section thereof (e.g., 100% opening) so that a portion in which the emission of the exhaust gas is varied according to the change in the area of the internal flow field of the first tail pipe 29 with the emission of the exhaust gas maintained through the second tail pipe 29 in the muffler 20 has been illustrated.

Therefore, the muffler 20 forms a basic flow of the exhaust gas which utilizes the inlet tube 23→the branch tube 24→the extension tube 26→the second external connection tube 27→the second tail pipe 29 as the flow path, and a variable flow of the exhaust gas which utilizes the inlet tube 23→the branch tube 24→the first external connection tube 25→the first tail pipe 28 as the flow path.

Therefore, with respect to the closing (0% opening) applied to the sections A, C, F, J illustrated in FIG. 9, the 100% opening applied to the sections E, I, K illustrated in FIG. 10, and the 50% opening applied to the sections B, D, G, H illustrated in FIG. 11, the basic flows of the exhaust gases are a same whereas the variable flows of the exhaust gases are different.

As an example, describing the basic flow of the exhaust gas with reference to FIGS. 9 to 11, the muffler 20 forms the flow path in which the exhaust gas is mostly collected in the first chamber 21-1 through the punching hole 23A (e.g., the number of punches is 84EA) of the inlet tube 23, the exhaust gas coming through the punching hole 27A of the second external connection tube 27 together with the exhaust gas coming from the extension tube 26 of the branch tube 24 and reflected by the lower plate 21C is discharged from the third chamber 21-3 to the second chamber 21-2 and introduced into the first chamber 21-1 through the punching hole 22-5 (e.g., the number of punches is 60EA) of the first baffle 22A, and the exhaust gas introduced into the first chamber 21-1 is discharged to the second tail pipe 29 through the second external connection tube 27.

The muffler 20 distributes/cancels a unpleasant low-frequency booming sound energy, which presses the driver's ears, by the expansion/diffusion of the flow rate of the exhaust gas through the punching holes 23A, 27A, 22-5 and the first, second, third chambers 21-1, 21-2, 21-3, reducing some amount of noise energy, and the punching hole 27A reduces an airflow sound component once again so that the engine exhaust sound having further reduced some amount of noise energy may be discharged.

Describing the variable flow of the exhaust gas with reference to the closing (0% opening) applied to the sections A, C, F, J illustrated in FIG. 9, the valve gate 33 of the electronic variable valve 30 closes the internal area of the first tail pipe 28, preventing the exhaust gas introduced into the first external connection tube 25 of the muffler 20 from being discharged to the atmosphere.

Therefore, the muffler 20 discharges the exhaust gas introduced into the inlet tube 23 to only the second tail pipe 29 in a state in which the first tail pipe 28 of the two first and second tail pipes 28, 29 is closed, theoretically reducing the entire area at which the flow rate of the exhaust gas is discharged by 50%. The condition of reducing the flow rate or cross-sectional area of the exhaust gas discharged from the exhaust system 1-1 to the atmosphere is a same as the condition of reducing the diameter of the tail pipe through which the exhaust gas is discharged in the structure of the general exhaust system. Such a valve operation condition is optimized mostly in an idle driving area or a low RPM driving area, which has a basic flow rate of the exhaust gas much smaller than the basic flow rate of the exhaust gas upon the 100% opening of the valve.

Therefore, the muffler 20 forms the first exhaust sound tone change section X (see FIG. 9) closed by the first external connection tube 25, the first tail pipe 28, and the electronic variable valve 30.

As a result, since the muffler 20 discharges the exhaust gas to only the second tail pipe 29, the speed of the exhaust gas is slower in a state in which the internal pressure of the muffler is and the internal resistance of the muffler is large so that the overall exhaust noise may be reduced. Through such a principle, it is possible to implement a quieter exhaust sound than that of the conventional exhaust system in a place in which the quiet exhaust sound is needed or in a vehicle traveling mode.

Subsequently, describing the variable flow of the exhaust gas with reference to the 50% opening applied to the sections B, D, G, H illustrated in FIG. 10, the valve gate 33 of the electronic variable valve 30 closes a half of the internal area of the first tail pipe 28 so that a portion of the exhaust gas introduced into the first external connection tube 25 of the muffler 20 is discharged to the atmosphere.

Therefore, the muffler 20 discharges the exhaust gas introduced into the inlet tube 23 to only the second tail pipe 29 in a state in which only a portion of the first tail pipe 28 of the two first and second tail pipes 28, 29 is closed, theoretically reducing the area of discharging the flow rate of the first tail pipe 28 side by 20 to 30%. Therefore, a condition of reducing the flow rate or cross-sectional area of the exhaust gas discharged to the atmosphere in the exhaust system 1-1 is a same as the condition of reducing the diameter of the tail pipe through which the exhaust gas is discharged in the structure of the general exhaust system. As illustrated in FIG. 11, the condition of the muffler is optimized in an idle driving area or a low RPM driving area, which has a basic flow rate of the exhaust gas a little smaller than the basic flow rate of the exhaust gas upon the 100% opening of the valve.

Therefore, the muffler 20 may implement a Mild-sporty exhaust sound compared to the quiet exhaust sound upon 0% opening illustrated in FIG. 9.

Furthermore, describing the variable flow of the exhaust gas with reference to the 100% opening applied to the sections E, I, K illustrated in FIG. 11, the valve gate 33 of the electronic variable valve 30 fully opens the internal area of the first tail pipe 28 so that the exhaust gas introduced into the first external connection tube 25 of the muffler 20 may be discharged to the atmosphere.

Therefore, the muffler 20 discharges the exhaust gas introduced into the inlet tube 23 to two paths through the two first and second tail pipes 28, 29 having the external diameters of a same sizes (e.g., Φ54) at the flow rate of 50%:50%. Therefore, the discharging of the flow rate through two paths at 50%:50% has a same condition as when there is no electronic variable valve 30 so that the exhaust gas is directly discharged to the first and second tail pipes 28, 29 of a relative short path, and the speed at which the exhaust gas is discharged is fast, causing a large noise so that the tough combustion sound of the engine is discharged at it is so that the driver may feel the sporty exhaust sound.

Therefore, the muffler 20 reduces the resistance against the flow of the exhaust gas so that a reflection pressure (load) transferred to the engine is low, contributing to increasing the output of about 2 to 5 PS in a RPM area of the engine.

In FIG. 9, the electronic variable valve 30 is matched with the sections A and C of the quiet exhaust sound-based map 54-1A and the sections F and J of the sporty exhaust sound-based map 54-1B according to the change in the accelerator pedal stroke from the aforementioned conditions, implementing the following operations and effects.

In the section A, in a section of a N stage racing and having very low engine torque of the vehicle 1, even if the accelerator pedal stroke is large, the electronic variable valve 30 maintains the closing (0% opening), and thus the exhaust gases coming from the left/right mufflers 20-1, 20-2 are discharged to only the first tail pipe 28 of the first and second tail pipes 28, 29, implementing the most quiet exhaust sound.

The section C is a section corresponding to "slow acceleration/constant speed driving" of the low speed, and the electronic variable valve 30 maintains the closing (0% opening), and thus the exhaust gases coming from the left/right mufflers 20-1, 20-2 are discharged to only the first tail pipe 28 of the first and second tail pipes 28, 29, implementing the most quiet exhaust sound.

In the section F, in a section having very low engine torque of the vehicle 1, even if the accelerator pedal stroke is large, the electronic variable valve 30 maintains the closing (0% opening), and thus the exhaust gases coming from the left/right mufflers 20-1, 20-2 are discharged to only the first tail pipe 28 of the first and second tail pipes 28, 29, implementing the most quiet exhaust sound.

Since the section J is a slow acceleration driving section upwards to the speed of 0→50 Km, the electronic variable valve 30 maintains the closing (0% opening), and thus the exhaust gases coming from the left/right mufflers 20-1, 20-2 are discharged to only the first tail pipe 28 of the first and second tail pipes 28, 29, implementing the quiet exhaust sound.

Furthermore, in FIG. 10, in the section B, in a section in which the engine torque is largely needed (e.g., uphill traveling) even in a section having a very low RPM, the exhaust pressure is required to be reduced to alleviate the burden of the vehicle output, and furthermore, the electronic variable valve 30 maintains the 50% opening due to the burden of the low-speed booming, and thus the exhaust gases coming from the left/right mufflers 20-1, 20-2 are discharged from the first and second tail pipes 28, 29 at the differentiated flow rates, implementing the Mild-sporty exhaust sound.

Since the section D is a section before entering the high-speed RPM, the electronic variable valve 30 maintains the 50% opening, and thus the exhaust gases coming from the left/right mufflers 20-1, 20-2 are discharged from the first and second tail pipes 28, 29 at the differentiated flow rates, implementing the Mild-sporty exhaust sound and emphasizing some amount of exhaust sounds upon shifting.

Since the sections G and H are sections corresponding to the "slow acceleration/constant speed driving" of the N stage racing and the low and medium speeds, the electronic variable valve 30 maintains the 50% opening, and thus the exhaust gases coming from the left/right mufflers 20-1, 20-2 are discharged from the first and second tail pipes 28, 29 at the differentiated flow rates, implementing the Mild-sporty exhaust sound.

Furthermore, in FIG. 11, since the section E is the medium and high speed and sudden start section, and a section in which the accelerator pedal stroke increases, the electronic variable valve 30 maintains the 100% opening, and thus the exhaust gases coming from the left/right mufflers 20-1, 20-2 are discharged from the first and second tail pipes 28, 29 at the same flow rates, implementing the sporty exhaust sound.

Since the sections I and K are the medium a high speed and sudden start sections and the accelerator pedal stroke is large, the electronic variable valve 30 maintains the 100% opening, and thus the exhaust gases coming from the left/right mufflers 20-1, 20-2 are discharged from the first and second tail pipes 28, 29 at a same flow rates, implementing the sporty exhaust sound.

Figure 12:
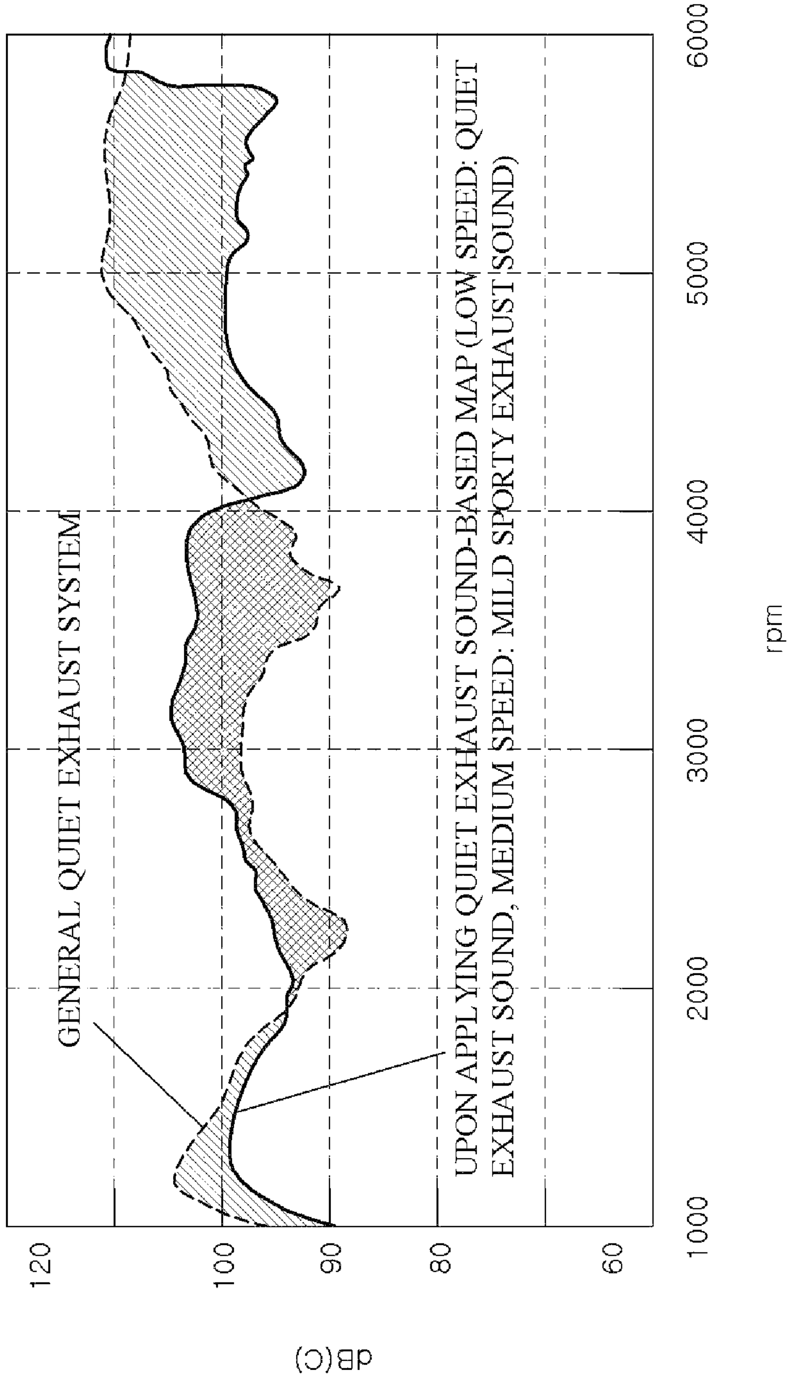
FIG. 12 and FIG. 13 are line diagrams comparing the engine exhaust sounds generated by the muffler of the vehicle exhaust system according to various exemplary embodiments of the present invention.
Figure 13:
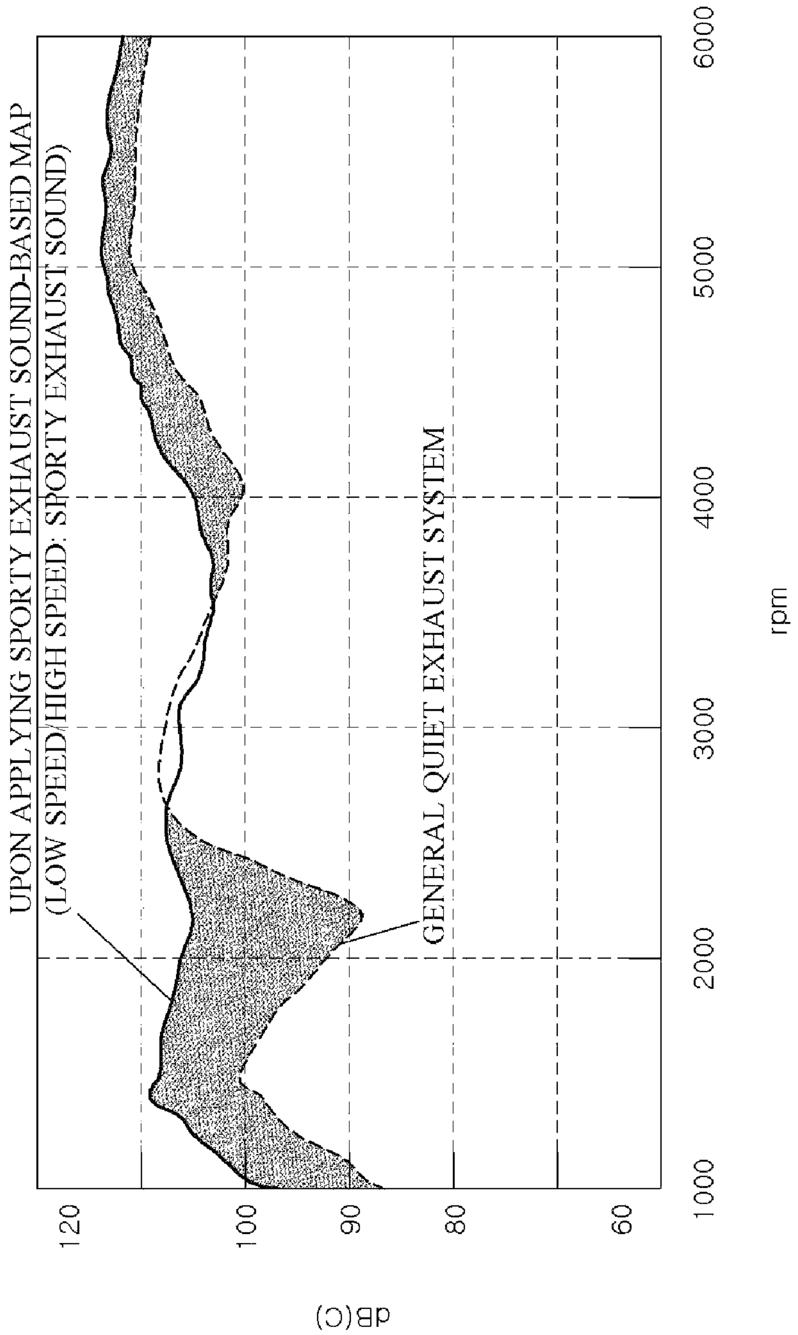

Meanwhile, FIG. 12, and FIG. 13 illustrate the actual exhaust sound evaluation results of the vehicle exhaust system according to the valve operation map by applying the electronic variable valve 30 to each of the left/right mufflers 20-1, 20-2 to control the valve opening.

As illustrated, the engine exhaust sound evaluation results prove that the engine exhaust sound level in the SMART DRIVE MODE-ECO/COMFORT states using the quiet exhaust sound-based map 54-1A (FIG. 12, a solid-lined line diagram) may implement a quieter exhaust sound in the low RPM area, and the engine exhaust sound level in the SMART DRIVE MODE-SPORT state using the sporty exhaust sound-based map 54-1B (FIG. 13, a solid-lined line diagram) may implement the differentiated and emphasized sporty exhaust sound in the low RPM area/start area and the high speed area.

As described above, the method for automatically changing the engine exhaust sound in conjunction with the traveling mode implemented by the exhaust system 1-1 applied to the vehicle 1 according to the exemplary embodiment of the present invention may vary the valve opening of the electronic variable valve 30 provided in the first tail pipe 28 of the first and second tail pipes 28, 29 of the muffler 20 discharging the exhaust gas coming from the engine by the mode recognition logic 50 connected to the engine ECU 1A to the atmosphere, and control the variation of the valve opening with the engine torque and the engine RPM based on the change in the accelerator pedal stroke in any one of the SMART DRIVE MODE-ECO state, the SMART DRIVE MODE-COMFORT state, and the SMART DRIVE MODE-SPORT state, implementing the quiet engine exhaust sound and the sporty engine exhaust sound depending on various vehicle traveling states provided by the SMART DRIVE MODE and increasing the vehicle/engine outputs, and may reflect the driving style and habit according to the change in the accelerator pedal stroke, generating the differentiated exhaust sound according to the automatic change in the engine exhaust sound.

Furthermore, the term "controller", "controller" or "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a chip. The processor may be implemented as one or more processors.

The controller or the controller may be at least one microprocessor operated by a predetermined program which includes a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated controller.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “inner”, “outer”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for interlocking an engine exhaust sound with a vehicle traveling mode, the method comprising:

confirming the vehicle traveling mode in a SMART DRIVE MODE generated by a mode selection device of a traveling mode system; and performing a SMART SHIFT control in which the engine exhaust sound is switched, the engine exhaust sound being generated by a muffler discharging an exhaust gas to an atmosphere according to a valve opening of an electronic variable valve, which is changed according to an accelerator pedal stroke, in the SMART DRIVE MODE, wherein the muffler includes:

a housing forming an internal space therein;

a pair of a first baffle and a second baffle for partitioning the internal space of the housing into a first chamber, a second chamber, and a third chamber:

an inlet tube for introducing the exhaust gas to send a portion of the introduced exhaust gas to the first chamber through a punching hole;

a 1IN-2OUT Y-shaped tube for sending a portion of branched exhaust gas of remaining introduced exhaust gas coming from the inlet tube to a first tail pipe to form a first exhaust sound tone change section and sending remaining branched exhaust gas to the third chamber to form a third exhaust sound tone change section; and a second external connection tube for introducing an internal exhaust gas coming from the first chamber to send the internal exhaust gas to a second tail pipe to discharge the internal exhaust gas and sending a portion of the internal exhaust gas through the punching hole to the third chamber to form a second exhaust sound tone change section.

2. The method of claim 1, wherein the SMART DRIVE MODE includes: a SMART DRIVE MODE-SPORT state, a SMART DRIVE MODE-ECO state, and a SMART DRIVE MODE-COMFORT state, and includes: a sporty exhaust sound-based map and a quiet exhaust sound-based map corresponding to each state.

3. The method of claim 2, wherein the performing of the SMART SHIFT control includes:

controlling to automatically switch the SMART DRIVE MODE, which enters one of the SMART DRIVE MODE-SPORT state, the SMART DRIVE MODE-ECO state, and the SMART DRIVE MODE-COMFORT state by confirming the accelerator pedal stroke; and controlling to match a switching mode exhaust sound, which generates an engine exhaust sound to which the sporty exhaust sound-based map is applied or an engine exhaust sound to which the quiet exhaust sound-based map is applied.

4. The method of claim 3, wherein the accelerator pedal stroke is classified into a first threshold of the accelerator pedal stroke, which is an entry reference of the SMART DRIVE MODE-SPORT state, and a second threshold of the accelerator pedal stroke, which is an entry reference of the SMART DRIVE MODE-ECO state and the SMART DRIVE MODE-COMFORT state.

5. The method of claim 4, wherein the SMART DRIVE MODE enters the SMART DRIVE MODE-SPORT state in an accelerator pedal stroke exceeding the first threshold of the accelerator pedal stroke, enters the SMART DRIVE MODE-ECO state in an accelerator pedal stroke smaller than the second threshold of the accelerator pedal stroke, and enters the SMART DRIVE MODE-COMFORT state in an accelerator pedal stroke which is equal to or less than the first threshold of the accelerator pedal stroke and equal to or greater than the second threshold of the accelerator pedal stroke.

6. The method of claim 3, wherein, in the SMART DRIVE MODE-SPORT state, the engine exhaust sound to which the sporty exhaust sound-based map is applied is generated, and in the SMART DRIVE MODE-ECO state and the SMART DRIVE MODE-COMFORT state, the engine exhaust sound to which the quiet exhaust sound-based map is applied is generated.

7. The method of claim 6, wherein each of the quiet exhaust sound-based map and the sporty exhaust sound-based map matches the valve opening of the electronic variable valve with one of closing, 50% opening, and 100% opening.

8. The method of claim 1, wherein the electronic variable valve is provided on one of the first tail pipe and the second tail pipe through which the exhaust gas is discharged from the muffler to the atmosphere, the first tail pipe and the second tail pipe connected to the muffler.

9. An exhaust system comprising:

a muffler for discharging an exhaust gas coming from an engine to a first tail pipe and a second tail pipe to an atmosphere, wherein the first tail pipe and the second tail pipe are connected to the muffler;

an electronic variable valve provided on the first tail pipe, and forming a valve opening in an internal space of the first tail pipe; and an exhaust sound change system configured for recognizing one of a SMART DRIVE MODE-ECO state, a SMART DRIVE MODE-COMFORT state, and a SMART DRIVE MODE-SPORT state as a vehicle traveling state in a SMART SHIFT control in a SMART DRIVE MODE, and changing the valve opening of the electronic variable valve according to an accelerator pedal stroke, wherein the muffler includes:

a housing forming an internal space therein;

a pair of a first baffle and a second baffle for partitioning the internal space of the housing into a first chamber, a second chamber, and a third chamber;

an inlet tube for introducing the exhaust gas to send a portion of the introduced exhaust gas to the first chamber through a punching hole;

a 1IN-2OUT Y-shaped tube for sending a portion of branched exhaust gas of remaining introduced exhaust gas coming from the inlet tube to the first tail pipe to form a first exhaust sound tone change section and sending remaining branched exhaust gas to the third chamber to form a third exhaust sound tone change section; and a second external connection tube for introducing an internal exhaust gas coming from the first chamber to send the internal exhaust gas to the second tail pipe to discharge the internal exhaust gas and sending a portion of the internal exhaust gas through the punching hole to the third chamber to form a second exhaust sound tone change section.

10. The exhaust system of claim 9, wherein the valve opening is changed to one of closing, 50% opening, and 100% opening.

11. The exhaust system of claim 9, wherein the punching hole perforated in the first baffle and a first open space portion and a second open space portion perforated in the second baffle fluidically-communicate the third chamber with the second chamber and the first chamber.

12. The exhaust system of claim 9, wherein the 1IN-2OUT Y-shaped tube includes a first external connection tube connected to the first tail pipe by forming one outlet of two outlets while being connected to the inlet tube by one inlet and an extension tube connected to the third chamber by forming another outlet.

13. The exhaust system of claim 9, wherein the second external connection tube has a double tube, and the double tube does not cover the punching hole.

14. The exhaust system of claim 9, wherein, in the first exhaust sound tone change section, the exhaust gas sent to the first tail pipe by closing the first tail pipe with the electronic variable valve is sent to the internal space of the housing, wherein, in the second exhaust sound tone change section, a portion of the exhaust gas sent to the second tail pipe exits the internal space of the housing, and wherein, in the third exhaust sound tone change section, a branched exhaust gas of the exhaust gas sent to the first tail pipe is sent to the internal space of the housing.

15. The exhaust system of claim 9, wherein the engine exhaust sound change system has a quiet exhaust sound-based map matching with the SMART DRIVE MODE-ECO state and the SMART DRIVE MODE-COMFORT state and a sporty exhaust sound-based map matching with the SMART DRIVE MODE-SPORT state, and wherein each of the quiet exhaust sound-based map and the sporty exhaust sound-based map matches with a voltage signal controlling the electronic variable valve.

* * * * *